United States Patent [19]
Aoki et al.

[11] Patent Number: 5,432,571
[45] Date of Patent: Jul. 11, 1995

[54] INFORMATION RECORDING CAMERA AND SYSTEM USING THE SAME

[75] Inventors: Hitoshi Aoki, Tokyo; Hiroshi Wakabayashi, Yokohama; Daiki Tsukahara, Hiratsuka; Hidenori Miyamoto, Urayasu, all of Japan

[73] Assignee: Nikon Corporation, Tokyo, Japan

[21] Appl. No.: 303,873

[22] Filed: Sep. 9, 1994

Related U.S. Application Data

[60] Continuation of Ser. No. 131,594, Oct. 5, 1993, abandoned, which is a division of Ser. No. 946,774, Sep. 18, 1992, Pat. No. 5,258,805, which is a continuation of Ser. No. 784,914, Oct. 30, 1991, abandoned, which is a division of Ser. No. 644,232, Jan. 22, 1991, Pat. No. 5,086,314, which is a continuation-in-part of Ser. No. 525,832, May 21, 1990, abandoned.

[30] Foreign Application Priority Data

| | | |
|---|---|---|
| May 25, 1989 [JP] | Japan | 1-131894 |
| Dec. 21, 1989 [JP] | Japan | 1-332300 |
| Jan. 22, 1990 [JP] | Japan | 2-10539 |
| Jan. 22, 1990 [JP] | Japan | 2-10540 |
| Jan. 26, 1990 [JP] | Japan | 2-15076 |
| Apr. 19, 1990 [JP] | Japan | 2-101815 |

[51] Int. Cl.$^6$ .............................. G03B 17/24
[52] U.S. Cl. ............................................ 354/106
[58] Field of Search ................ 354/410–424, 354/429–434, 289.12, 105–106, 75–76

[56] References Cited

U.S. PATENT DOCUMENTS

| | | | |
|---|---|---|---|
| 1,664,818 | 4/1928 | Hewitt | 354/411 |
| 2,677,999 | 5/1954 | Smith | 354/411 |
| 4,443,080 | 4/1984 | Saegusa | 354/432 |
| 5,075,712 | 12/1991 | Ohtsuka et al. | 354/475 |
| 5,086,314 | 2/1992 | Aoki et al. | 354/412 |
| 5,258,805 | 11/1993 | Aoki et al. | 354/475 |

*Primary Examiner*—David M. Gray
*Attorney, Agent, or Firm*—Shapiro and Shapiro

[57] ABSTRACT

A camera records exposure correction information on a recording medium such as a film. The exposure correction information may be based on calendar information, including date information and time information, and geographic information corresponding to the geographic location of the camera. A printing device effects exposure correction based on the recorded information during printing, thereby obtaining a properly exposed print. In a case when the camera itself effects exposure correction, the camera records exposure correction prohibiting information to prohibit exposure correction from being effected by the printing device.

35 Claims, 27 Drawing Sheets

INFORMATION RECORDING CAMERA AND SYSTEM USING THE SAME

This is a continuation of application Ser. No. 08/131,594, filed Oct. 5, 1993, (now abandoned), which is a division of application Ser. No. 07/946,774, filed Sep. 18, 1992, (U.S. Pat. No. 5,258,805), which is a continuation of application Ser. No. 07/784,914, filed Oct. 30, 1991, (abandoned), which is a division of application Ser. No. 07/644,232, filed Jan. 22, 1991, (U.S. Pat. No. 5,086,314), which is a continuation-in-part of application Ser. No. 07/525,832, filed May 21, 1990, (abandoned).

BACKGROUND OF THE INVENTION

1. Field of the Invention

The present invention relates to an exposure control apparatus for camera, and more particularly to determination of exposure in consideration of season or sunrise/sunset time. The invention also relates to an information recording camera which records exposure correction information and to a system using such a camera.

2. Related Background Art

Automatic exposure control of a camera is generally achieved by detecting the brightness of an object with a light metering device, determining an exposure value based on said object brightness and the sensitivity of the photographic film used, and driving the diaphragm and the shutter according to said exposure value.

However, in such exposure determination based solely on the information on object brightness and that on film sensitivity, the atmosphere or mood of the printed photograph is often significantly different from that actually felt by the photographer, because the exposure is usually so determined as to obtain a constant amount of exposure to light. For example a scene in the evening dusk can be reproduced as an unnatural photograph as light as in the daytime.

Also a camera incorporating an electronic flash device automatically giving flash in response to the detection of object brightness executes a photographing operation with flash emission automatically to a relatively dark object, for example an object in the evening dusk. For this reason the evening tone intended by the photographer cannot be obtained on the photograph.

The photographer may manually correct the exposure or prohibit the flash emission in order to prevent such situations, but such manual operations are not only cumbersome but require experience for obtaining an appropriate exposure.

On the other hand, a photographing operation with strong background illumination, such as back-lighted photographing on the sunny summer beach or photographing with snow in the background, results in so-called underexposed photograph in which the main object appears undesirably dark. Such phenomenon is even more conspicuous in a reversal film with a narrow latitude than in a negative film which generally has a relatively wide latitude.

SUMMARY OF THE INVENTION

An object of the present invention is to provide an exposure control apparatus for use in a camera, enabling appropriate exposure control for various photographing situations.

In a preferred embodiment of the present invention, there is provided means for detecting the season at the photographing operation, and the exposure control apparatus determines the exposure based on the object brightness and the detected season. For example in the back-lighted photographing on the sunny summer beach or with snow in the background, the exposure is automatically so determined as to give an over-exposure.

Also there is provided means for detecting the time of photographing operation, and the exposure is determined according to the object brightness and the detected time. For example, if the time detecting means detects a twilight time, the exposure control apparatus determines an exposure value at the underexposed side by a predetermined amount in comparison with the normal state. Thus the tone of morning or evening sunshine at the sunrise or sunset can be reproduced on the photograph without manual exposure correction.

In a preferred embodiment of the present invention, there is provided means for prohibiting the function of the electronic flash device in the twilight situation, in order to reproduce the tone of morning or evening sunshine at the sunrise or sunset.

Furthermore, even on a given date or at a same time of day, the exposure condition may be different because of the difference in season or in sunrise/sunset time depending on the location of photographing or other photographing situation. For example the appropriate exposure is different, depending on whether the location is in the Northern or Southern hemisphere, or on the difference in longitude and/or in latitude even in a same country, or on whether the daylight saving time is used.

Consequently the exposure control apparatus constituting another preferred embodiment of the present invention comprises calendar means for measuring date and time, means for entering geographic information, means for identifying season by correcting the date and time of the calendar means according to the geographic information, and means for exposure correction based on thus identified season. There is also provided means for recognizing sunrise and sunset times, based on said entered geographic information and said corrected date and time, and the exposure correction is made according to said sunrise/sunset time. Said geographic information can be given by the information on longitude and latitude, or by a city name.

Also in a preferred embodiment of the present invention, the exposure control apparatus comprises means for recognizing the height of the sun at the photographing location based on said date and time, and said information on longitude and latitude of the photographing location, and applying correction to the exposure value when the height of sun is within a certain range. For example, the correction on the exposure value is made when the height of sun is within a low range or a high range.

In still another embodiment of the present invention, the exposure control apparatus is equipped with means for discriminating whether the photographing operation is conducted indoors or outdoors, and the exposure value is corrected according to the result of said discrimination, in combination with whether the photographing time corresponds to a twilight time and whether the season is summer or winter. For example, the exposure value is determined at the underexposed side by a predetermined amount in an outdoor photographing operation in the twilight, or at the overexposed side by a predetermined amount in an outdoor photographing operation in the summer or winter daytime.

Even if no exposure correction is effected during photographing, there is no problem if the printed photo is made with proper exposure. Therefore, according to another aspect of the present invention, a camera and a camera system are provided in which the camera records exposure correction information on a recording medium, from which information exposure correction can be effected during subsequent printing of photographs by a printing device. The invention also provides a camera and a camera system in which, when exposure correction is effected by the camera, the camera records exposure correction prohibiting information to prohibit exposure correction from being effected by a printing device.

DESCRIPTION OF THE PREFERRED EMBODIMENTS

At first a first embodiment of the present invention will be explained with reference to FIGS. 1 to 5.

Figure 1:
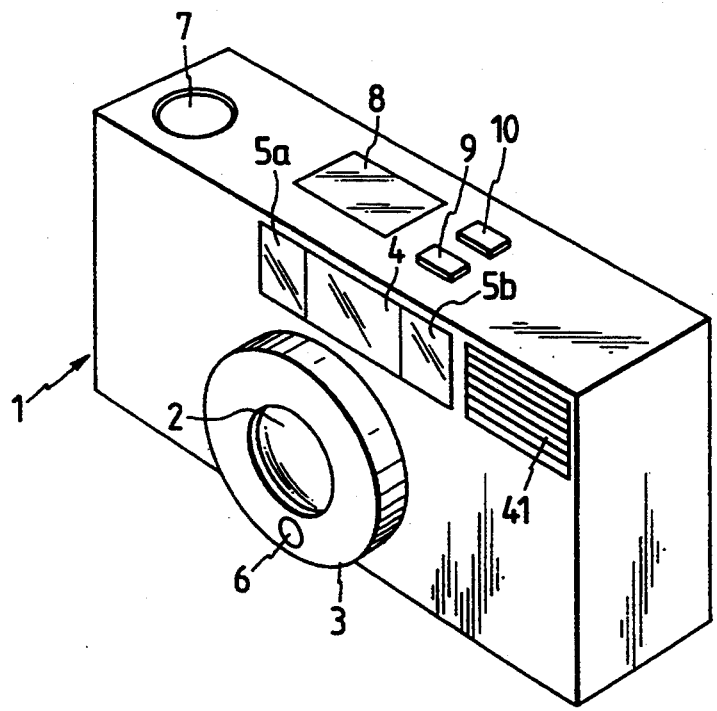
FIGS. 1 and 2 are respectively front and rear perspective views of a camera constituting a first embodiment of the present invention.
Figure 2:
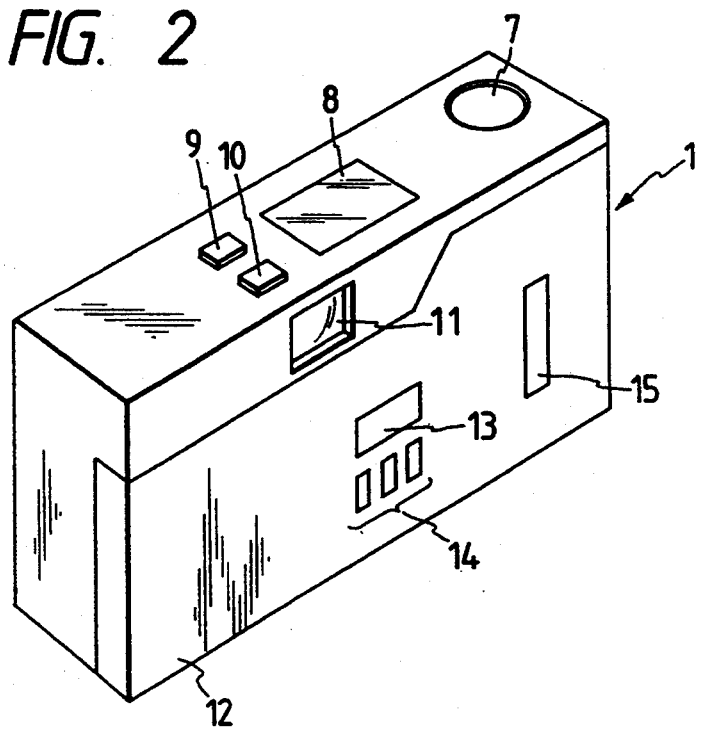

Referring to FIGS. 1 and 2, on the front face of a camera housing 1 there are provided a lens barrel 3 having a phototaking lens 2, a finder objective lens 4, range-finding windows 5a, 5b for active auto focusing, and a light emitting window 41 for electronic flash. On the front face of the lens barrel 3 there is provided a photosensor 6 for light metering. Said photosensor 6 receives the light in a central area and in a peripheral area of the object field, and converts the light of those areas into electrical signals. On the upper face of the camera housing there are provided a shutter release button 7, a display window 8 of a liquid crystal display for displaying the number of photographed film frames or the set state of various modes, a mode switching button 9 for the electronic flash device, and a mode setting button 10 for setting an exposure correction mode to be explained later.

Also as shown in FIG. 2, a view-finder eyepiece 11 is provided on the rear face of the camera housing 1. Inside a rear cover 12 which can be opened from the camera housing 1, there is provided a data back (not shown) for recording date and time on the film, said data back incorporating a timer circuit for measuring date and time. On the outer face of the rear cover 12 there are provided a display device 13 for displaying the data to be recorded by said data back, push-buttons 14 for selecting the date or time to be recorded or setting such date and time, and a window 15 for reading the film type information printed on the loaded film cartridge.

Figure 3:
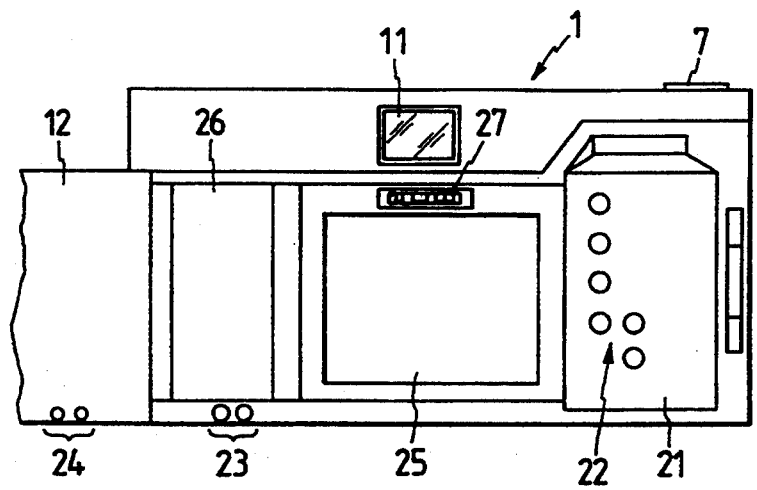
FIG. 3 is a rear view of a camera with a rear cover open.

FIG. 3 shows a state with open rear cover 12. In a film chamber 21 in the camera housing there are provided DX contacts 22, which come into contact with DX code contacts provided on the surface of the film cartridge when it is loaded in the film chamber 21. The DX code contacts are provided for representing film information by the positions of contacts, and are already known. Said film information is data specific to the photographic film, such as the kind of film (negative or reversal) and the film sensitivity.

The camera housing 1 and the rear cover 12 are respectively provided with contacts 23 and contact pins 24, which mutually contact when the rear cover is closed, thereby enabling signal transmission between the above-mentioned data back and a CPU provided in the camera housing. In FIG. 3, there are further shown an exposure aperture 25, a spool 26, and an idler sprocket 27 for film wind/rewinding.

Figure 4:
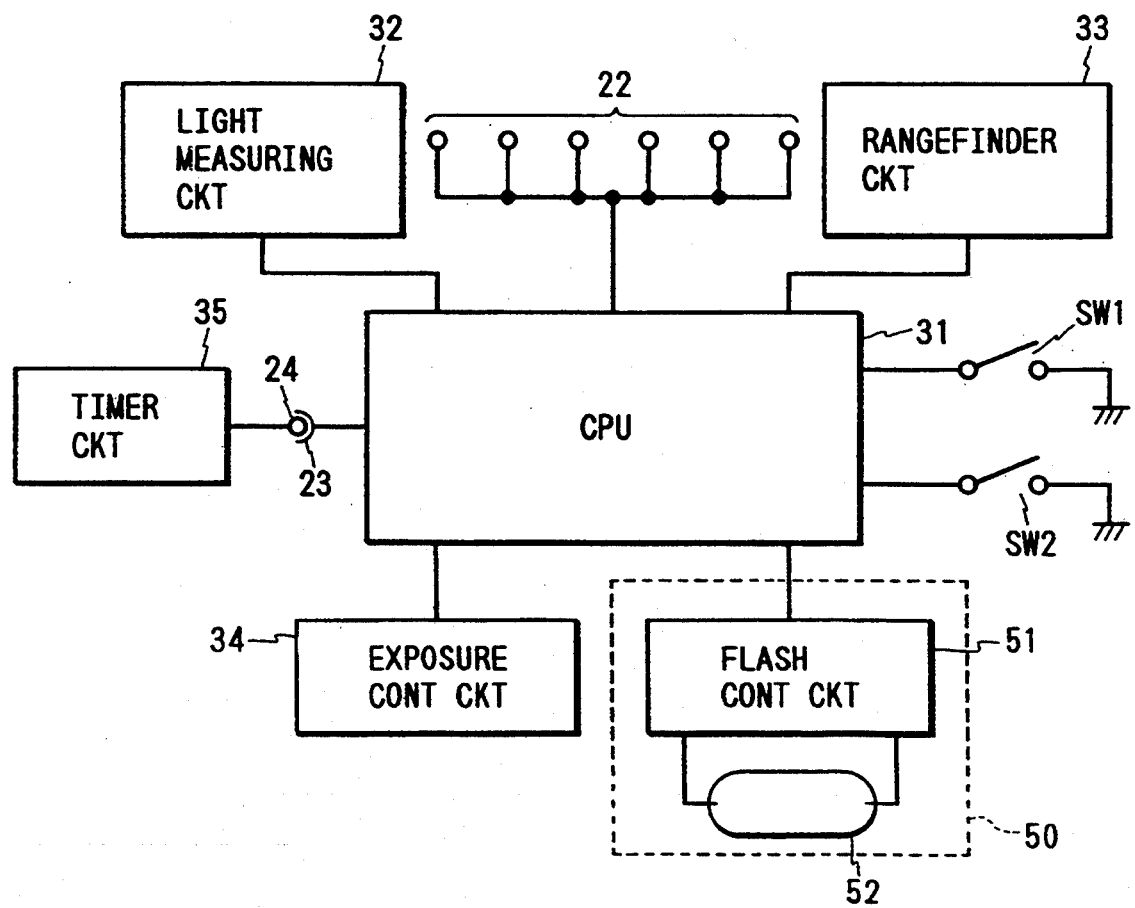
FIG. 4 is a block diagram of the entire structure of an exposure control apparatus.

FIG. 4 is a block diagram of the exposure control apparatus for the camera.

To the CPU 31 for controlling the operation of the camera, there are connected a light measuring circuit 32, a range-finder circuit 33, an exposure control circuit 34, a flash control circuit 51 of an electronic flash unit 50, and switches SW1, SW2.

The light measuring circuit 32 is connected to the photosensor 6 mentioned above, receives electrical signals therefrom, corresponding to the amounts of light in the central area and peripheral area of the object, calculates the brightness of the object based on said electrical signals, and sends the result of said calculation to the CPU 31.

The range-finder circuit 33 detects the distance to the object by a known active range-finding method, and sends the obtained result to the CPU 31.

The exposure control circuit 34 controls the operation of a diaphragm and a shutter (not shown) in response to an instruction from the CPU 31, thereby executing the photographing operation.

The flash control circuit 51, to which a flash emission tube 52 is connected, accumulates an electric charge necessary for the flash emission from said flash tube 52. The charge is accumulated in a main capacitor (not shown) in response to an instruction from the CPU 31. The circuit 51 controls the flash emission from said flash tube 52 at the flash photographing operation to be explained later.

The switches SW1, SW2 are linked with the shutter release button 7, and are respectively closed when said button 7 is depressed to a first stroke position and a second stroke position.

Also the above-mentioned DX contacts 22 are connected to the CPU 31, for entering the film information to the CPU 31.

Furthermore, when the rear cover 12 is closed, the timer circuit 35 of the data back provided in said rear cover 12 is connected to the CPU 31 through the contact 23 and contact pins 24, thus entering information on date and time to the CPU 31.

In the following there will be explained the control sequence of the CPU, with reference to a flow chart shown in FIG. 5.

Figure 5:
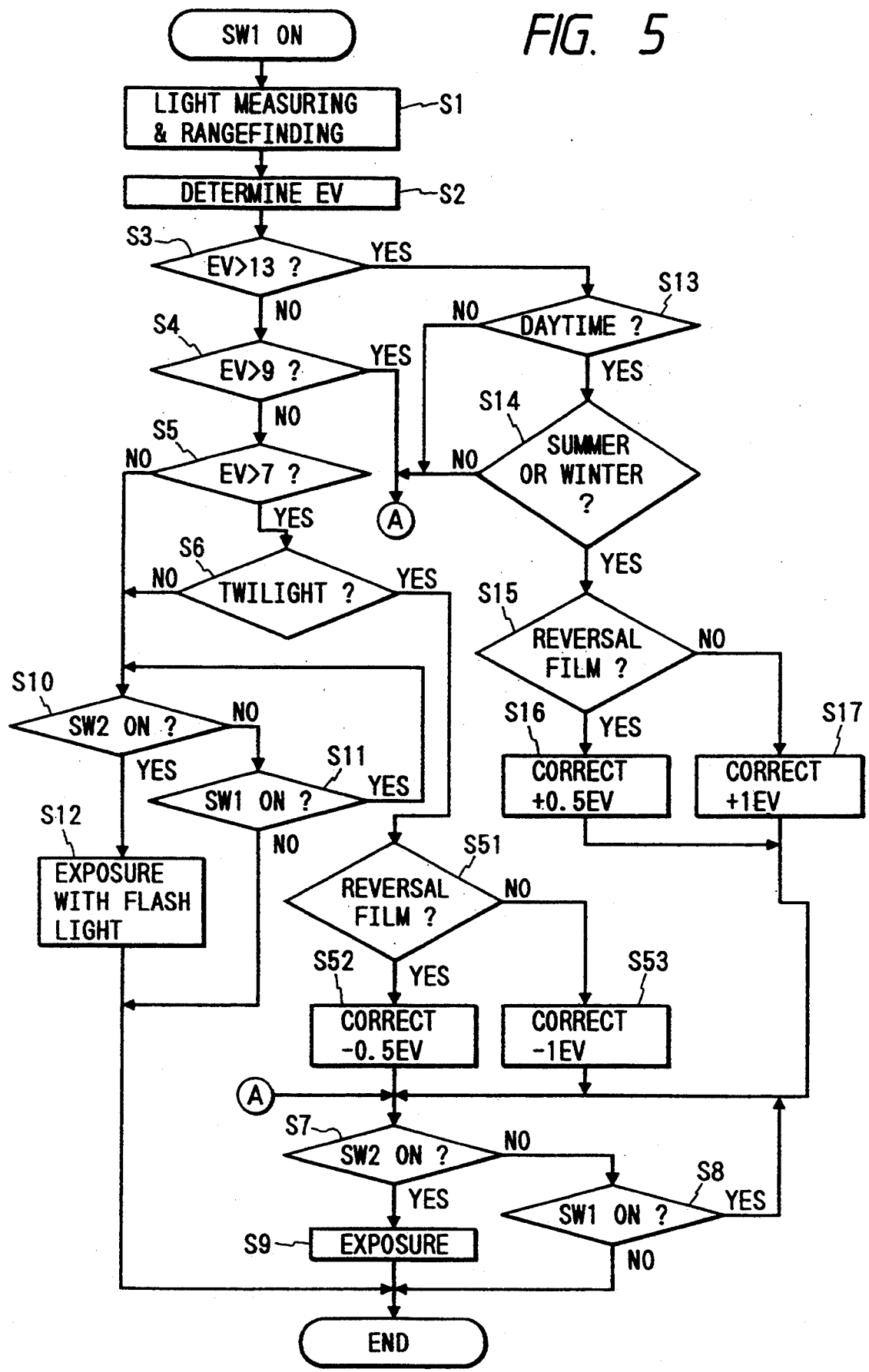
FIG. 5 is a flow chart of control sequence.

The program shown in FIG. 5 is activated when the exposure correction mode is selected by the mode selector button 10 and the switch SW1 is closed by the actuation of the shutter release button 7. At first a step S1 executes range finding and light measuring, by activating the range-finder circuit 33 and the light measuring circuit 32, and reading the object distance and the object brightness respective therefrom. Then a step S2 calculates the exposure value EV from said object brightness and the film sensitivity entered from the DX code contacts of the loaded film cartridge through the DX contacts 22. Said exposure value EV becomes larger for a higher brightness of the object, for a given film sensitivity.

A next step S3 discriminates whether the calculated exposure value exceeds 13 EV, and, if not, the sequence proceeds to a step S4. Said step S4 discriminates whether the calculated exposure value EV exceeds 9 EV, and, if not, a step S5 discriminates whether the exposure value exceeds 7 EV. If the discrimination of the step S5 turns out negative, namely if the exposure value is equal to or lower than 7 EV, the sequence proceeds to a step S10 for awaiting the closing of the switch SW2. On the other hand, if said discrimination turns out affirmative, namely if the exposure value is larger than 7 EV but equal to or less than 9 EV, the sequence proceeds to a step S6.

The step S6 discriminates, by reading the current time from the timer circuit 35, whether the current time is in the morning or in the evening, namely a twilight time. The discrimination of twilight time is made by whether the current time is included within predetermined ranges, which may be varied according to the season of the year.

If the step S6 gives an affirmative result, a step S51 discriminates, based on the film information entered through the DX contacts 22, whether the loaded film is a reversal film or a negative film. Since the reversal film has a narrower exposure latitude than in the negative film, said step S51 identifies whether the film has a wide or narrow exposure latitude.

If the step S51 identifies a reversal film, a step S52 corrects the exposure value, calculated in the step S2, to the under-exposure side by 0.5 EV, but if a negative film is identified, a step S53 corrects said exposure value to the under-exposure side by 1 EV, and the sequence proceeds to a step S7. On the other hand, if the step S6 gives a negative result, the sequence proceeds to a step S10.

If the step S3 identifies that the exposure value exceeds 13 EV, indicating that the object is very bright, the sequence proceeds to a step S13 for discriminating, based on the time obtained from the timer circuit 35, whether the current time is daytime. If the result of the step S13 is negative, the sequence proceeds to the step S7. If said result is affirmative, a step S14 discriminates, based on the data obtained from the timer circuit 35, whether the current season is summer or winter, or other season. If it is summer or winter the sequence proceeds to the step S15, but, if it is neither summer nor winter, the sequence proceeds to a step S7.

The step S15 discriminates, based on the film information entered from the DX contacts 22, whether the loaded film is a reversal film or a negative film. If a reversal film is identified, a step S16 corrects the exposure value, calculated in the step S2, to the over-exposure side by 0.5 EV, while, if a negative film is identified, a step S17 corrects said exposure value to the over-exposure side by 1 EV, and the sequence proceeds to the step S7.

The step S7 discriminates whether the switch SW2 is closed. If it is not, a step S8 discriminates whether the switch SW1 is closed. If it is closed the sequence returns to the step S7, but, if it is not, the sequence is terminated.

When the step S7 identifies that the switch SW2 is closed, a step S9 executes the photographing operation by driving the phototaking lens 2 to a predetermined in-focus position with a focusing motor (not shown) based on the object distance read in the step S1, and then driving the diagram and the shutter according to the exposure value obtained in the step S2, S16, S17, S52 or S53. Thereafter the film is advanced by a frame by a film winding motor (not shown), and the sequence is terminated.

Also the step S10 similarly awaits the closing of the switch SW2, and, when it is closed, a step S12 executes a flash photographing operation, by focusing the phototaking lens 2 as explained above, then exposing the film by driving the diaphragm and the shutter according to the exposure value for the flash photographing determined in advance, and at the same time causing flash emission from the flash tube 52 by means of the flash control circuit 51. Thereafter the film is advanced by a frame by the winding motor, and the sequence is terminated.

In the above-explained sequence, the exposure value EV calculated in the step S2 is classified into four ranges $13<EV$, $9<EV\leq13$, $7<EV\leq9$, and $EV\leq7$, and the exposure value at the photographing is controlled as follows in each range:

Case of $13<EV$:

This is the case of a very bright object, and the exposure value EV is automatically corrected in the following manner if the photographing is conducted in the daytime and in summer or in winter. In this case, the exposure value is corrected to the over-exposure side by 0.5 EV in case of the reversal film with narrower latitude, or by 1 EV in case of the negative film with wider latitude. Such correction prevents the underexposure in the conventional photographing, even on the beach in a fine summer day or in a snow scene in winter. However, even in case of $13<EV$, the above-mentioned correction is not conducted if the photographing time is not summer or winter, or not in the daytime.

Case of $9<EV<13$:

In this case the photographing is conducted according to the exposure value EV calculated in the step S2.

Case of $7<EV\leq9$:

This is so-called twilight situation, and the exposure value is corrected if the photographing time is in the morning or evening, to the underexposure side by 0.5 EV in case of the reversal film of narrower latitude, or by 1 EV in case of the negative film with wider latitude. In addition, in this case (in the morning or evening), the flash emission of the electronic flash unit 50 is prohibited. The tone of the morning sunlight or evening sunlight can be reproduced on the photograph by the exposure correction and the prohibition of function of the electronic flash unit 50 as explained above.

If the photographing time is not in the twilight time, the exposure value is not corrected and the electronic flash unit emits flash light.

Case of $EV\leq7$:

In this case the photographing operation is conducted with flash, since the object is considerably dark. In summary, flash light emission is conducted by the electronic flash unit usually when the exposure value is equal to or less than 9 EV, but, in the twilight situation, when the exposure value is equal to or less than 7 EV. Stated otherwise, the reference exposure value for effecting flash emission is shifted to the darker side by 2 EV in the twilight situation.

The above-explained EV discrimination process (steps S3–S5) of the present embodiment is the case of a film sensitivity of ISO 100, but the EV for discrimination varies if the sensitivity of the loaded film is different from ISO 100. More specifically, the EV for discrimination becomes higher or lower respectively for a film of higher or lower sensitivity.

Figure 6:
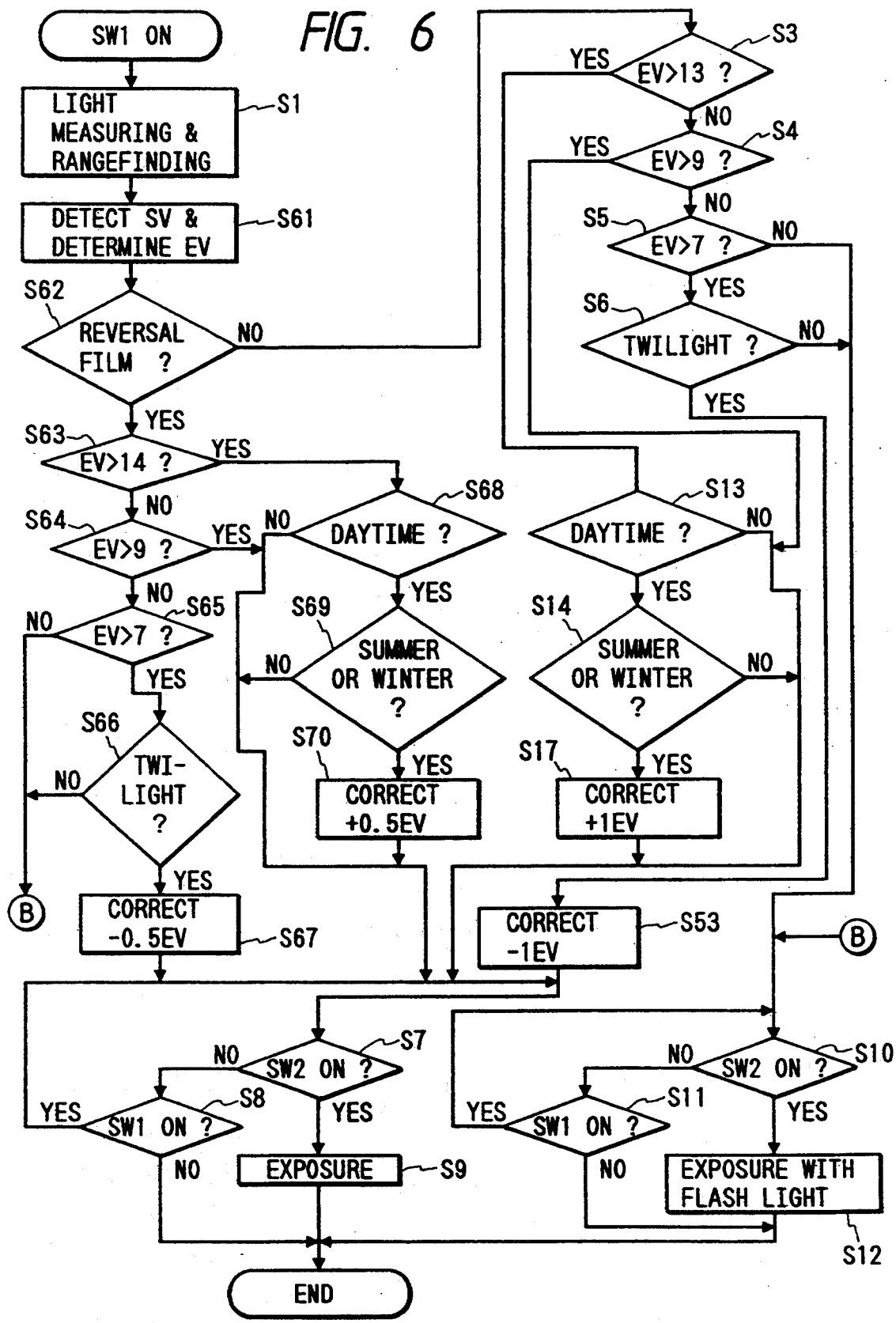
FIG. 6 is a flow chart of a variation of said control sequence.

Said EV used for discrimination may be determined in consideration of the film latitude, in addition to the film sensitivity. FIG. 6 shows a flow chart for such case, which is designed for a film sensitivity of ISO 100, and in which same steps as those in FIG. 5 are represented by same numbers.

In the following there will be explained the flow chart in FIG. 6, with emphasis on the difference from FIG. 5. This program is started when the switch SW1 is second occurence closed by the actuation of the mode selector button 10. At first a step S1 executes range-finding and light measuring. Then a step S61 reads the film information through the DX contacts 22, and extracts the information on the film sensitivity. The exposure value is calculated from said film sensitivity and the object brightness obtained by said light measurement, and the sequence proceeds to a step S62. The step S62 discriminates whether the loaded film is a reversal film or a negative film, based on said film information, and the sequence proceeds to the step S3 for executing the procedure explained above in case of the negative film, or to a step S63 in case of the reversal film.

Steps S63, S64 and S65 constitute, corresponding to the above-mentioned steps S3, S4 and S5, an EV discrimination process utilizing ranges defined by EV 13, EV 9 and EV 7 for a negative film, but by EV 14, EV 9 and EV 7 for a reversal film. Because the reversal film has a wider latitude in the underexposure side than the negative film, a positive correction is applied to the reversal film in case of a highly bright object.

Steps S68 and S69 are similar to the steps S13 and S14. When the step S69 provides an affirmative discrimination, a step S70 corrects the exposure value by +0.5 EV. If a step S66, similar to the step S6, provides an affirmative discrimination, a step S67 corrects the exposure value by $-0.5$ EV.

The above-explained case applies to a film of ISO 100, but the EV's for discrimination become larger or smaller respectively for a film of higher or lower sensitivity.

In the foregoing explanation, the correction of the exposure value is based on the season, time and kind of film, but other factors such as color temperature of the object and direction of the camera may be detected for identifying the forward or back lighted condition, thereby enabling more precise exposure correction. Also exposure correction in further consideration of the object distance allows approximate identification whether the object is a person or a scene, thereby providing more accurate correction. Still other factors such as temperature, humidity, air pressure, longitude, latitude etc. may be added in the correction of the exposure value.

It is furthermore possible to modify the exposure value stepwise by dividing the time more finely.

Furthermore, instead of correcting the calculated exposure value EV, it is also possible to apply correction for example to the object brightness obtained by the light measuring circuit.

In the following there will be explained a second embodiment of the present invention.

Figure 7:
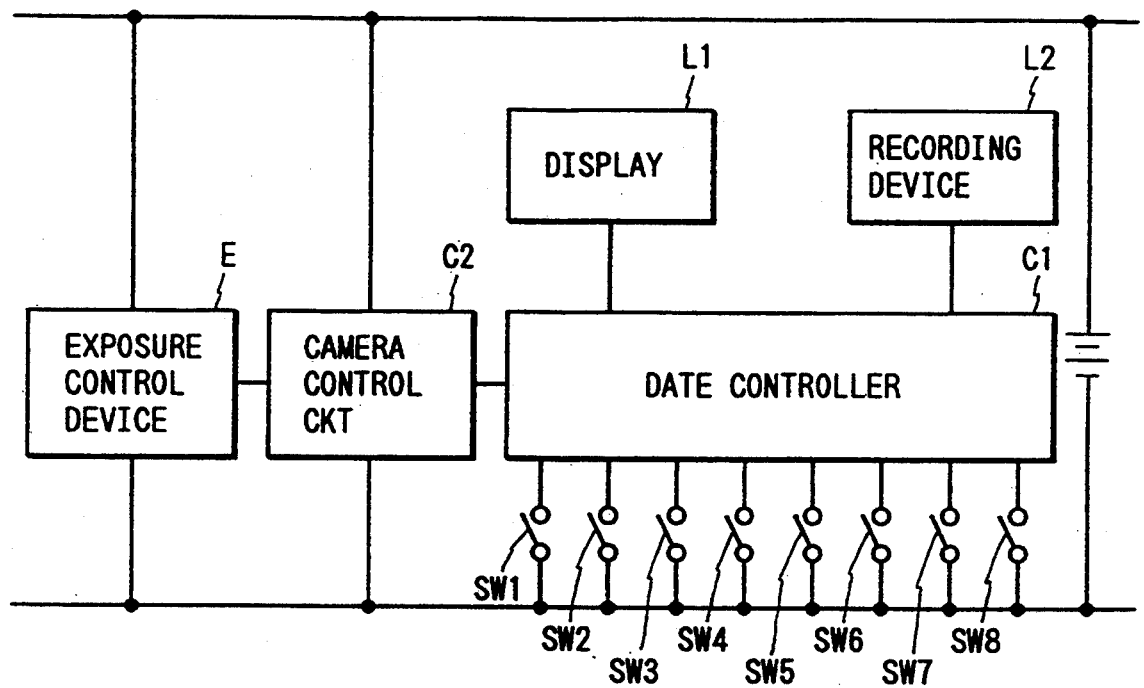
FIG. 7 is a block diagram of the exposure control apparatus constituting a second embodiment of the present invention.

FIG. 7 schematically shows an exposure control apparatus constituting a second embodiment, in which a a date controller circuit C1 has a data bank for time difference correction, in addition to known circuits such as a clock circuit for measuring date and time and having calendar function, a display control circuit for driving a display unit L1, and a data recording control circuit for driving a data recording device L2. As will be explained later, the date control circuit C1 is constructed as to recognize the season based on the measured date and time, and to recognize the sunrise and sunset times based on the date, time and geographic information.

There are also provided a camera control circuit C2 for controlling the drive sequence of the camera, and an exposure control device E for controlling the shutter and the diaphragm of the camera.

Figure 8:
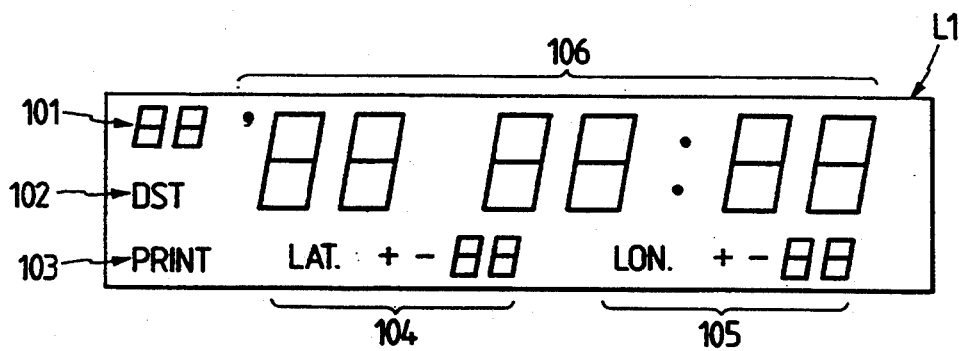
FIG. 8 is an external view of a display unit.

As shown in FIG. 8, the display unit L1 is provided with a display area 101 for indicating a time difference correction code, a display area 102 for indicating the daylight saving time, a display area 103 for indicating the completion of data recording, a display area 104 for indicating a correction number for the latitude, a display area 105 for indicating a correction number for the longitude, and a display area 106 for selectively indicating year, month and day or day, hour and minute.

The data recording device L2 records the data displayed on the display unit L1 into a recording medium such as the photographic film or a CCD.

Eight operating switches SW1-SW8 are connected to the date controller circuit C1. The switches SW1, SW2 are provided for entering a correction code for time difference. Certain cities of the world are selected in advance as references, and a time difference correction code represented by a two-digit number is assigned to each city, for example 21 for Tokyo, 20 for Beijing and 04 for Los Angeles. The geographic information is entered into the date controller circuit C1 by said correction code. Thus the time difference is automatically corrected, based on a map stored in advance in the date controller circuit C1, according to the correction code entered by the switches SW1, SW2.

Said map contains said correction code and a time difference corresponding to the reference city indicated by said correction code, in pairs. The switches SW1 and SW2 respectively enter the places of 10 and 1 of the code, and it is convenient if each switch increases the figure stepwise at each actuation. The entry of the geographic information is not limited to the entry of the above-mentioned correction codes, but may also be achieved by the direct entry of names of cities or locations, or by pointing of suitable locations on a displayed world atlas, as in the conventional so-called world clock. In any method, the time difference is corrected by the entered geographic information, whereby the date and time measured by the clock device vary.

The switch SW3 is provided for setting a daylight saving time mode, and the normal time mode and the daylight saving time mode are alternated by repeated actuations. When the daylight saving time mode is selected, the time measured by the clock device is corrected by a predetermined amount.

The switches SW4, SW5 are provided for correcting the latitude and longitude. When the sunrise/sunset times determined from the date and time corresponding to the time difference correction code selected by the switches SW1, SW2 are different from the actual sunrise/sunset times, namely when the photographing location is distant from the reference city corresponding to the time difference correction code, said times are corrected by the manipulation of the switches SW4, SW5.

The correction with the switches SW4, SW5 is achieved by the entry of positive or negative values corresponding to the differences in latitude and longitude from the entered reference city. For example, if the sunrise/sunset times are determined in the Pacific standard time of the U.S.A., taking Los Angeles as reference, these times in Seattle located to the North are different. The above-mentioned correction for latitude and longitude is conducted for compensating such difference in the sunrise/sunset times.

The switch SW6 is used for switching the display mode, and changes, at each actuation, the display mode of the display unit L1, for example year-month-day, month-day-year, day-month-year, day-hour-minute and off (no display) in cyclic manner.

The switch SW7, which is a selector switch, selects the correction mode at the first actuation, and then shifts the digit to be corrected stepwise at each subsequent actuation.

The switch SW8 varies stepwise the figure of the digit selected by the selector switch SW7.

Figure 9:
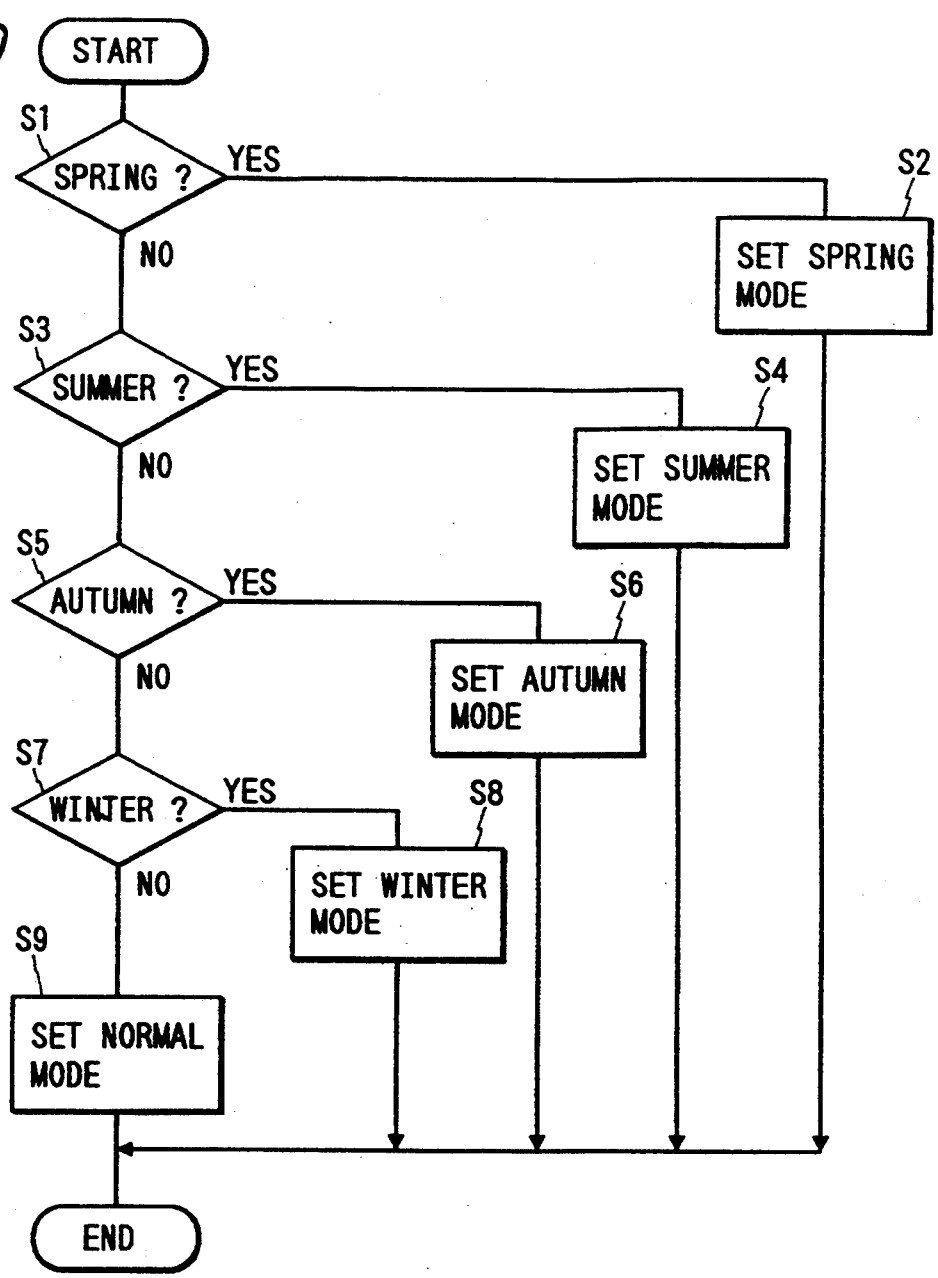
FIG. 9 is a flow chart of season recognizing sequence.

FIG. 9 shows the flow chart of season recognition. The boundary between the seasons is defined for example by spring equinox, summer solstice, autumn equinox, winter solstice, or the feeling of season in each city.

A step S1 discriminates whether the season is spring, based on tile date measured by the clock device, and, if it is spring, the exposure correction mode to be explained later is set at the spring mode, or, if it is not spring, the sequence proceeds to a step S3 for discriminating whether the season is summer. Thereafter the summer, autumn and winter are discriminated and the exposure correction mode is set at a corresponding mode (steps S4–S8). In case of indoor or night photographing, the normal mode is set instead of the above-mentioned exposure correction mode (step S9).

Figure 10:
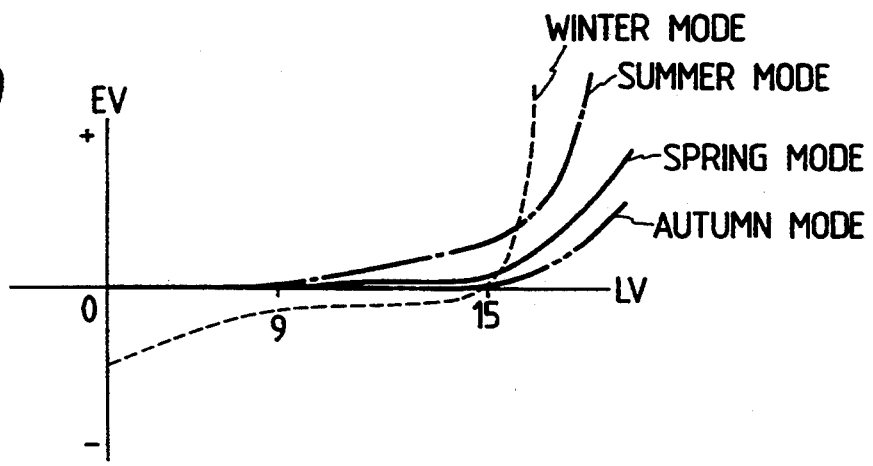
FIG. 10 is a chart showing the relation between exposure value and object brightness.

FIG. 10 is a chart indicating the relation between the exposure value and the object brightness in the exposure correction mode corresponding to the season recognized as explained above, wherein the abscissa indicates the object brightness LV and the ordinate indicates the exposure value EV.

In the spring mode, the exposure is slightly corrected to the over-exposure side for an object with light value LV exceeding 9, thereby reproducing the object relatively light and expressing the atmosphere of spring.

In the summer mode, the exposure is corrected further to the over-exposure side than in the spring mode, thus expressing the dazzling sunshine of summer.

In the autumn mode, the exposure is maintained at the substantially standard state.

In the winter mode, the exposure is corrected to the under exposure side, thereby giving a generally dark tone in the photograph. However, the exposure for an object with LV exceeding 15 is corrected to the over-exposure side. Since such object is a snowy scene, such correction is suitable for reproducing the snow in white color. In photographing in the areas close to the equator, the summer mode is almost always selected, so that the above-explained exposure mode in consideration of snow is not required.

Figure 11:
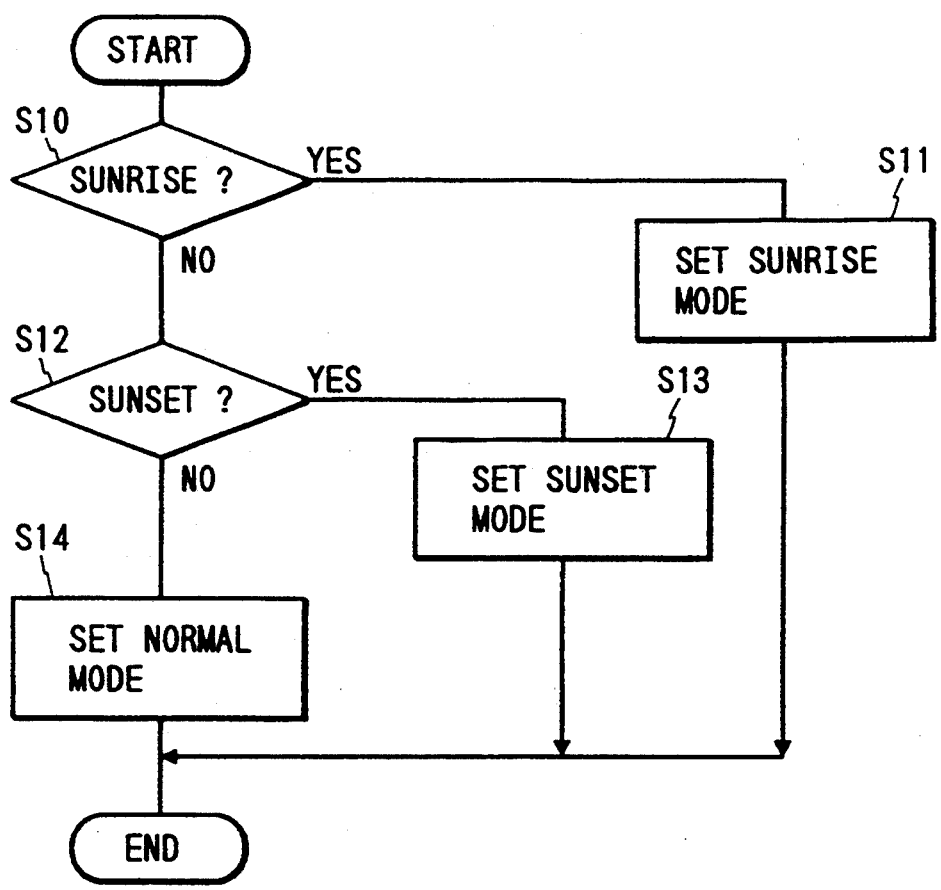
FIG. 11 is a flow chart of sunrise/sunset discrimination.

FIG. 11 is a flow chart for discriminating sunrise/sunset times, for determining the exposure correction mode by discriminating whether the current time is close to the sunrise or sunset time.

As explained before, the sunrise/sunset times are identified from the date and the geographic information, namely from the time difference correction code and the correction values for latitude and longitude. At first a step S10 discriminates whether the current time is close to the sunrise time, and, if it is close, the exposure correction mode is set at the sunrise mode (step S11). If the current time is not close to the sunrise time, a step S12 discriminates whether it is close to the sunset time, and, if it is close, a step S13 sets the exposure correction mode at the sunset mode. If, the current time not close to the sunrise time or to the sunset time, a step S14 selects the normal mode.

Figure 12:
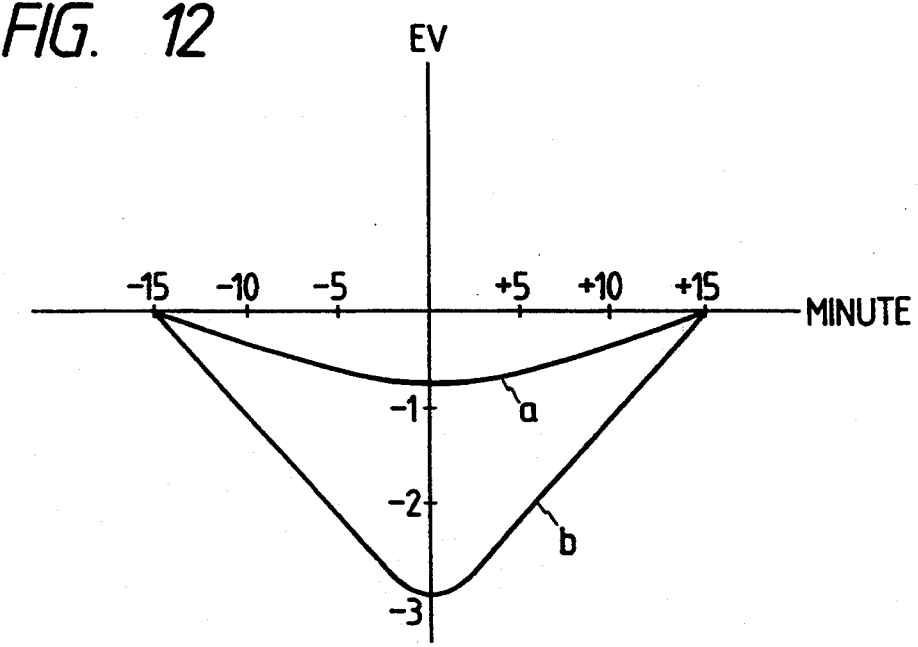
FIG. 12 is a chart showing the relation between exposure value and object brightness depending on the sunset time.

FIG. 12 shows the relation between the exposure value and the object light value, in the exposure correction mode corresponding to the sunrise/sunset times recognized as explained above. A curve a indicates the amount of exposure correction for the sunset situation. The origin indicates the moment of sunset and other figures along the indicate hours before or after the sunset. The ordinate indicates the exposure value EV. The exposure is corrected to the under-exposure side, at and around the sunset, in order to reproduce the scene in the twilight.

A curve b indicates the amount of exposure correction for a sunset situation wherein the sun is included in the image frame. In such case the exposure is corrected further to the under-exposure side. The presence of the sun in the image frame can be discriminated for example by a multiple light measuring system disclosed in the U.S. Pat. No. 4,443,080.

The exposure correction for the sunrise situation is similar to that shown in FIG. 12, but the normal mode is restored within a shorter time from the sunrise than from the sunset.

Figure 13:
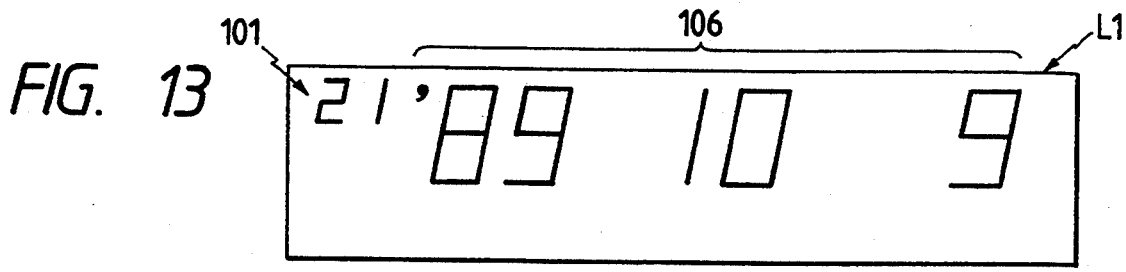
FIGS. 13 to 17 are views showing different modes of display in the display unit.
Figure 14:
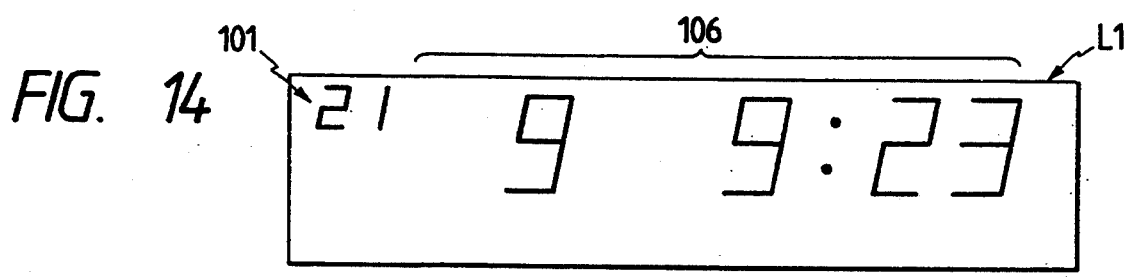

FIGS. 13 and 14 show the displays of year-month-day and day-hour-minute on the display unit L1 in case Tokyo (code 21) is selected by the correction code.

Figure 15:
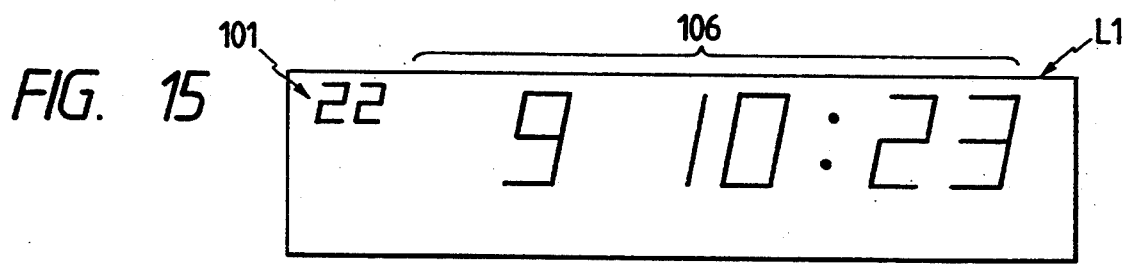

FIG. 15 shows the display in case a time difference correction code for Sidney (code 22) is selected in the state shown in FIG. 14. In this case the time difference between Sidney and Tokyo is 1 hour. However, since Tokyo is in the Northern hemisphere while Sidney is in the Southern hemisphere, the internal season recognizing logic recognizes a season opposite to that of Tokyo.

Figure 16:
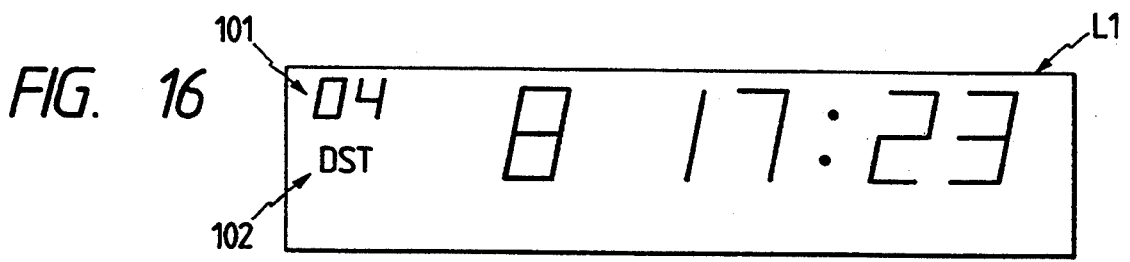

FIG. 16 shows a case of selection of Los Angeles. As Los Angeles (code 04) is in the daylight saving time, there is selected the daylight saving time mode, as indicated by DST mark.

Figure 17:
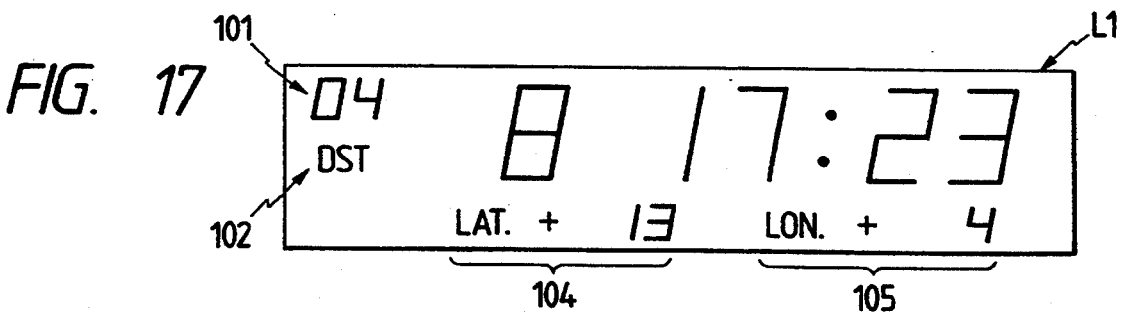

FIG. 17 shows the case of Seattle, which employs the U.S. Pacific standard time as in Los Angeles, but is distant therefrom. The time difference correction code "04" is same as that for Los Angeles. Los Angeles is approximately located at a latitude 34° N and a longitude 118° W, while Seattle is approximately located at a latitude 47° N and a longitude 122° W. Thus the sunrise/sunset times are corrected by entering +13° in latitude and +4° in longitude, taking Los Angeles as reference. The sunrise/sunset times are so corrected as to account for the fact that the time from sunrise to sunset in Seattle is longer in summer and shorter in winter than that in Los Angeles.

In the following there will be explained the function of the present embodiment.

Figure 18:
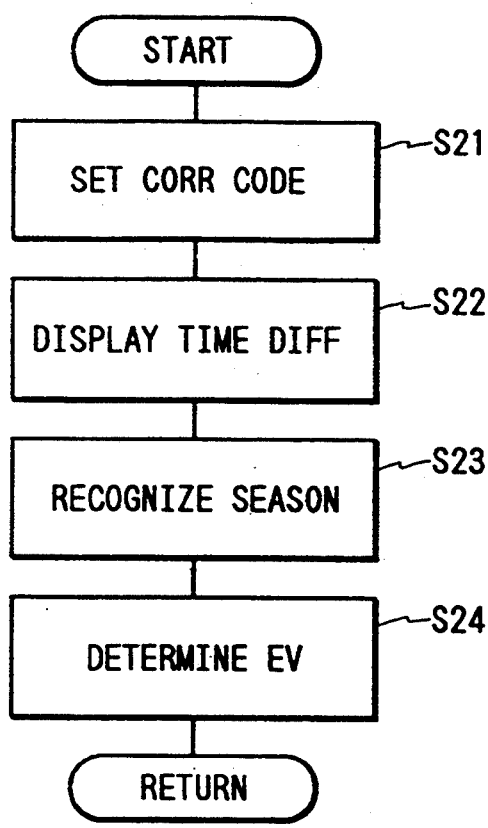
FIGS. 18 to 20 are flow charts of the operation of the first embodiment.

FIG. 18 is a flow chart of the sequence for correcting the exposure by recognizing the time difference and the season through the entry of geographic information.

At first the time difference correction code corresponding to the reference city, namely the geographic information, is entered by the switches SW1, SW2 (step S21). Then the time difference from the current time is calculated from said correction code and displayed (step S22). The season is recognized as already explained in relation to FIG. 9, based on the date read from the clock device (step S23), and the exposure correction is made as shown in FIG. 10 (step S24).

Figure 19:
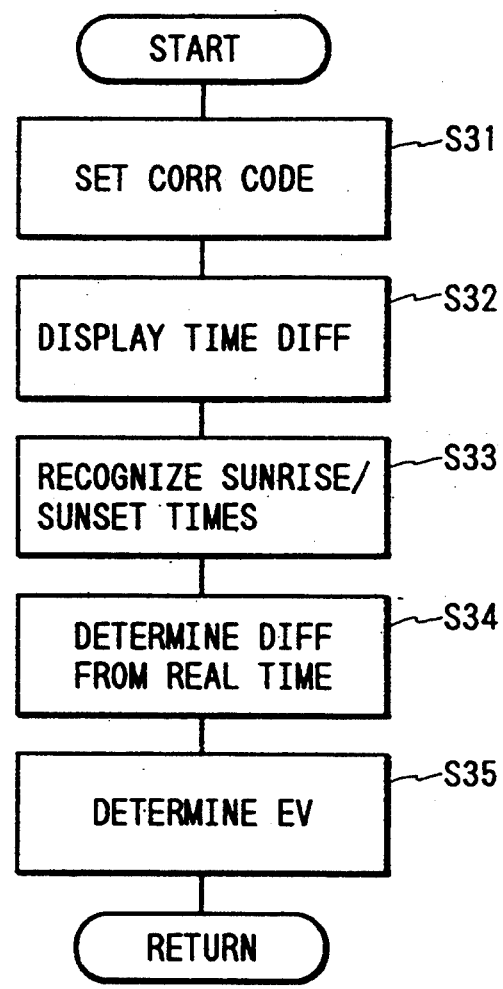

FIG. 19 is a flow chart of the sequence for correcting the exposure, by recognizing the time difference and the sunrise/sunset times through the entry of the geographic information.

At first, as in the above-explained steps S21, S22, the time difference is corrected and displayed (steps S31, S32). Then the sunrise/sunset times are recognized (step S33). The, exposure correction mode is set through the recognition of the difference between the current time and the sunrise/sunset times according to the function shown in FIG. 11 (step S34), and the exposure correction is made according to the chart shown in FIG. 12 (step S35).

Figure 20:
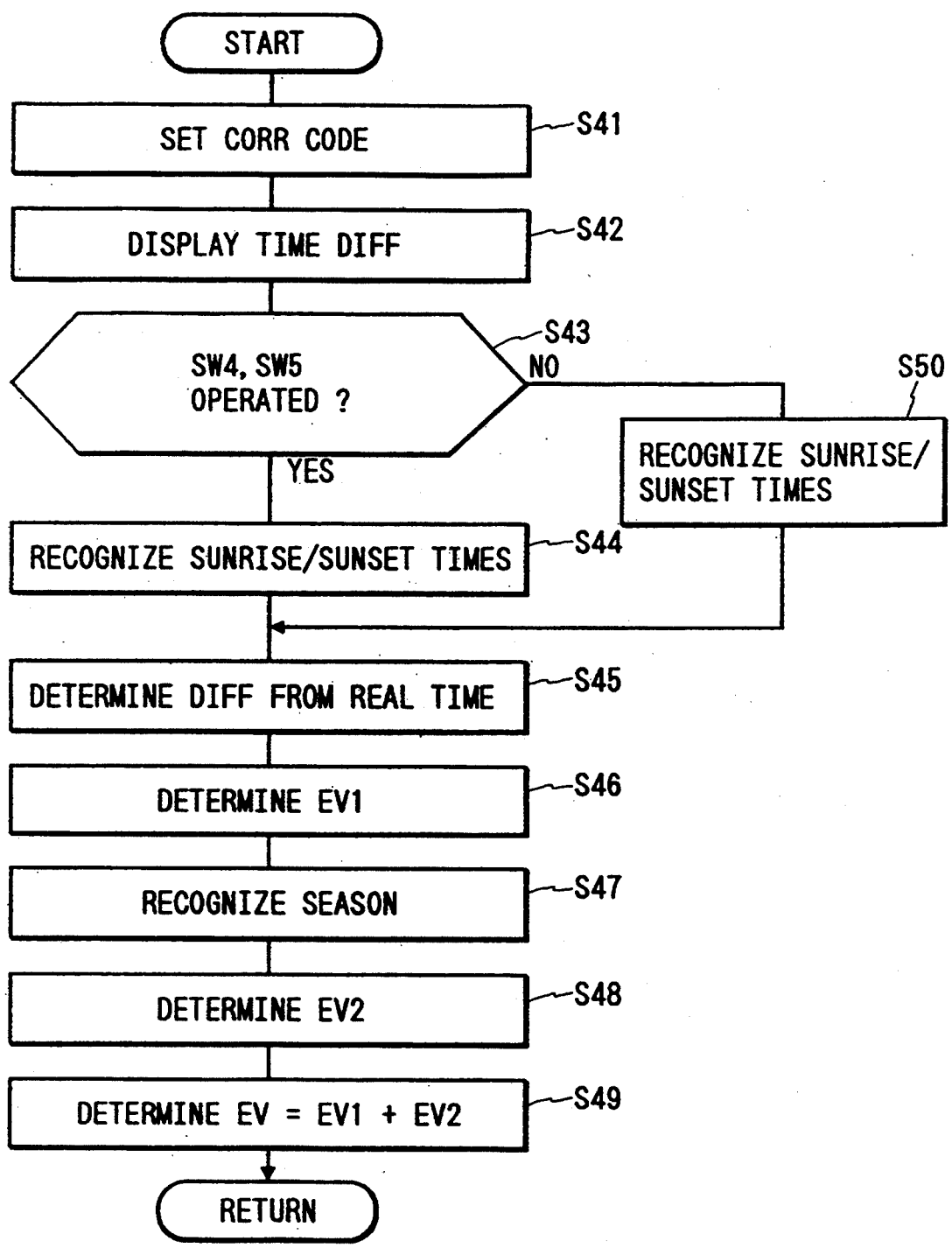

FIG. 20 is a flow chart of the sequence for correcting the exposure by recognizing the time difference and the sunrise/sunset times through the entry of geographic information with correction for latitude and longitude.

At first, as in the above-explained steps S31, S32, the time difference is corrected and displayed (steps S41, S42). Then there is discriminated whether the correction switches SW4, SW5 have been actuated (step S43), and, if the latitude and/or longitude is corrected, the sunrise/sunset times are recognized according to the corrected geographic information (step S44). Thus the difference between the recognized sunrise/sunset times and the current time is calculated (step S45), and the exposure correction mode is set according to the sequence shown in FIG. 11, based on the result of said calculation and the exposure correction amount EV1 is obtained (step S46). Then the season is recognized according to the sequence shown in FIG. 9, based on the date read from the clock device (step S47), and the exposure correction amount EV2 is calculated according to the chart shown in FIG. 10 (step S48). Finally the exposure correction amount EV is determined by adding the amount EV1 determined in the step S46 and the amount EV2 determined in the step S47 (step S49).

If the correction for latitude or longitude is not made in the step S43, the sunrise/sunset times are recognized from the initially entered geographic information (step S50), and the sequence proceeds to the step S45.

The correction for latitude and longitude in the above-explained embodiment consists of entry of a time difference correction code and then entry of correction data for latitude and longitude for a location distant from the reference city corresponding to said time difference correction code, but it is also possible to directly enter the latitude and longitude of a desired location. Also cities distant from the reference cities may be stored as a map in the internal memory for enabling the time difference correction without entry of the time difference correction code, or inversely a city may be displayed by the latitude/longitude data entered.

Also the cumbersome entry of cities may be simplified by inserting, into the camera, one of IC cards representing geographic regions and storing representative locations.

Also if the sunrise/sunset times alone are considered, such times alone may be memorized even without the world clock.

It is furthermore possible to effect the photographing operation with normal exposure without correction and to record the calculated exposure correction value on the film, for example, it would then be possible to apply a corresponding correction at the image reproduction, as, for example, at photographic printing. It is furthermore possible to record the photographing location, date and time, and to apply the corresponding correction at the time of printing by means of a printer incorporating the above-explained algorithm for exposure correction.

In case the exposure is corrected according to the sunrise/sunset times or the season, further correction to the normal state at the printing is undesirable. Consequently, for a film frame photographed according to said algorithm for exposure correction, a signal for prohibiting the correction at printing is preferably recorded on the film.

In the following there will be explained a third embodiment of the present invention.

Figure 21:
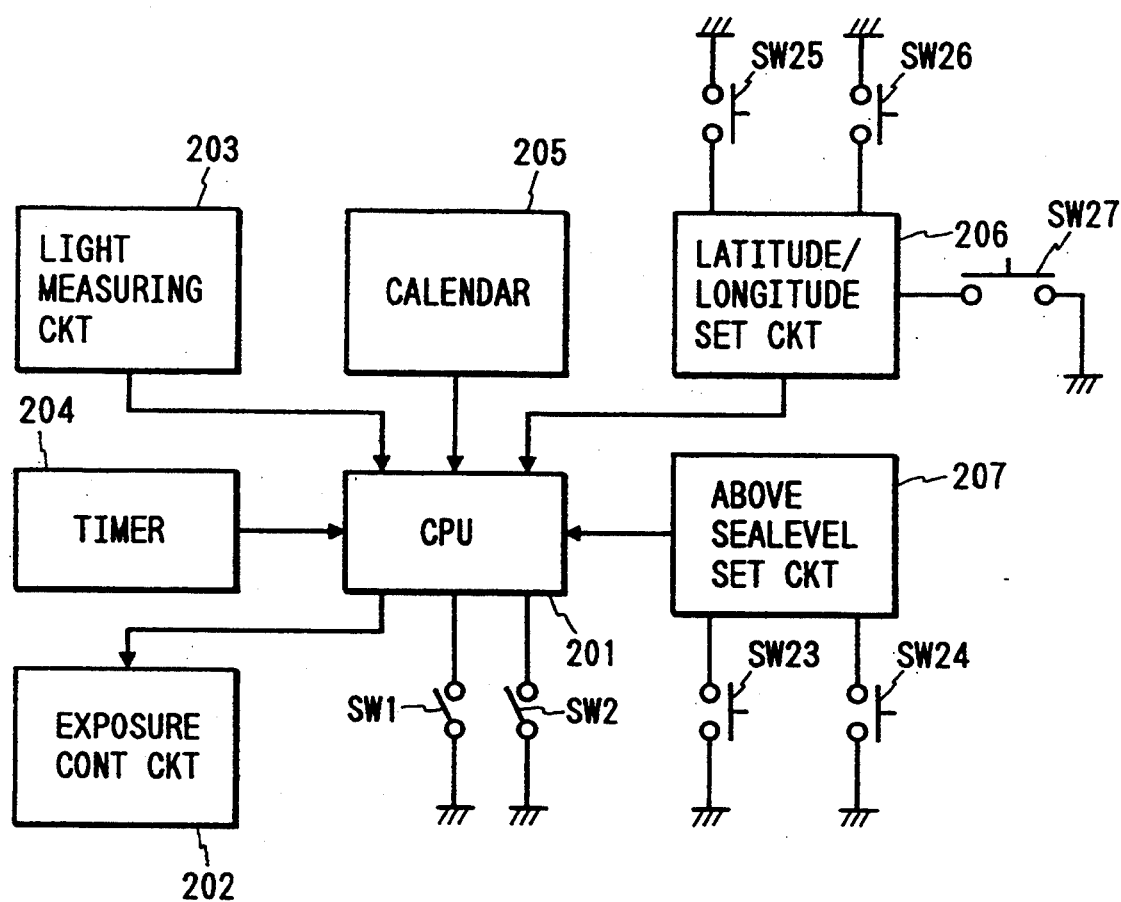
FIG. 21 is a block diagram of a second embodiment of the present invention.

In an exposure control apparatus shown in FIG. 21, a CPU 201 for controlling the operation of the camera, is connected, as in the first embodiment, to an exposure control circuit 202, a light measuring circuit 203 and a timer circuit 204. A calendar 205, in cooperation with the timer circuit 204 provides the CPU 201 with the Greenwich standard time (reference time including month and date) G.M.T. A latitude/longitude setting circuit 206 gives the latitude and longitude of the photographing location in response to the actuation of switches SW25-SW27, while a height-above-sea-level setting circuit 207 sends the height above sea level of the photographing location to the CPU, in response to the actuation of switches SW23, SW24. Switches SW1, SW2 are closed in relation to the actuation of the shutter releasing operation as in the previous embodiments.

Figure 22:
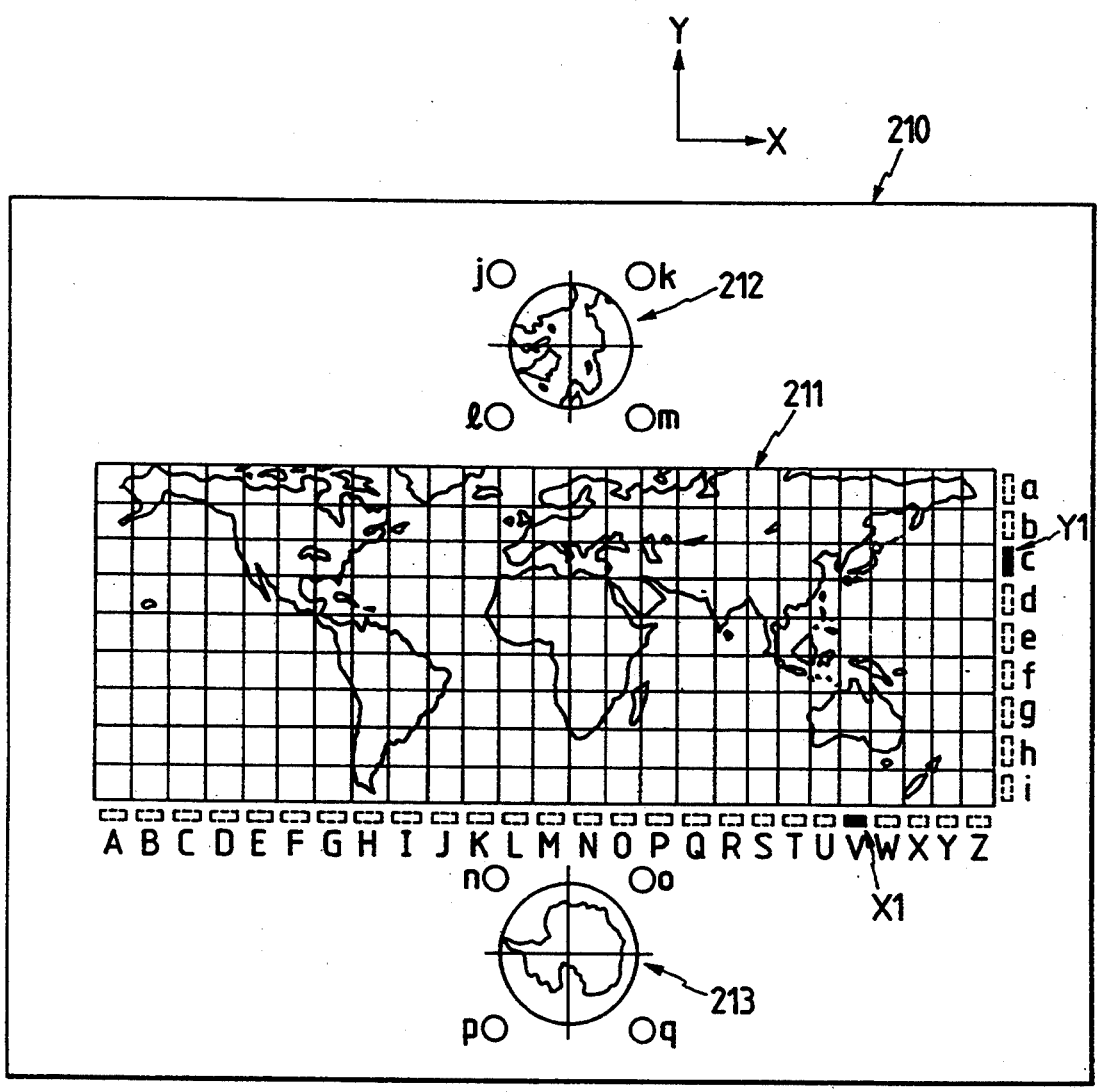
FIG. 22 is a view of a display image driven by a latitude/longitude setting circuit.

FIG. 22 shows a displayed image of the latitude/longitude setting circuit 206. At the center of an image frame 210, a world map 211 is displayed by Mercator presentation, in a range from 60° N to 60° S. Above and below said world map 211 there are displayed maps 212, 213 of Arctic circle and Antiarctic circle. On the world map 211 there are shown latitude lines and longitude lines at constant intervals, and, below and at the right side of the world map there are provided symbols A-Z and a-i for identifying the areas defined by said latitude lines and longitude lines. Also each of the Arctic and Antiartic maps 212, 213 is divided into four quadrants, and said quadrants are given symbols j-k and n-q.

Figure 23:
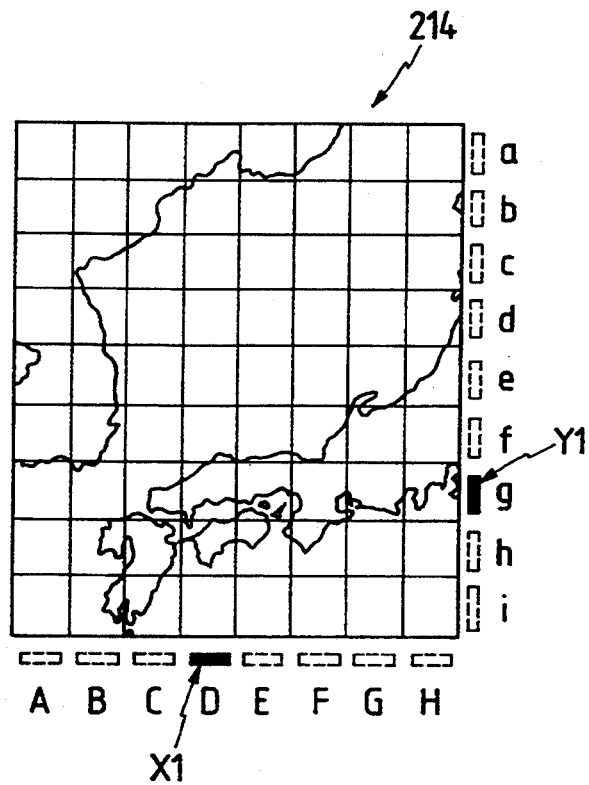
FIGS. 23 and 24 are views showing examples of a magnified area specified by said display image.

For example, if the photographing location is in the western a part of Japan, the switch SW25 is actuated to move the X-moving mark X1 to the symbol "V" and the switch SW26 is actuated to move the Y-mark Y1 to the symbol "c". By turning on the switch SW27 in this state, there is displayed, as shown in FIG. 23, a magnified view of an area specified by the symbols V and c. This magnified view 214 also has latitude lines and longitude lines in equal distances, and symbols A-H and a-i are shown below and at the right side of the display.

For example, if the photographing location is Hiroshima in this display, the switch SW25 is actuated to move the X-mark X1 to a symbol D and the switch SW26 is actuated to move the Y-mark Y1 to a symbol g. By turning on the switch SW27 in this state, the representative latitude and longitude (center values) of the area defined by the symbols D and g are specified and are given to the CPU. The representative latitude and longitude may be the latitude and longitude of a principal city in the defined area.

Figure 24:
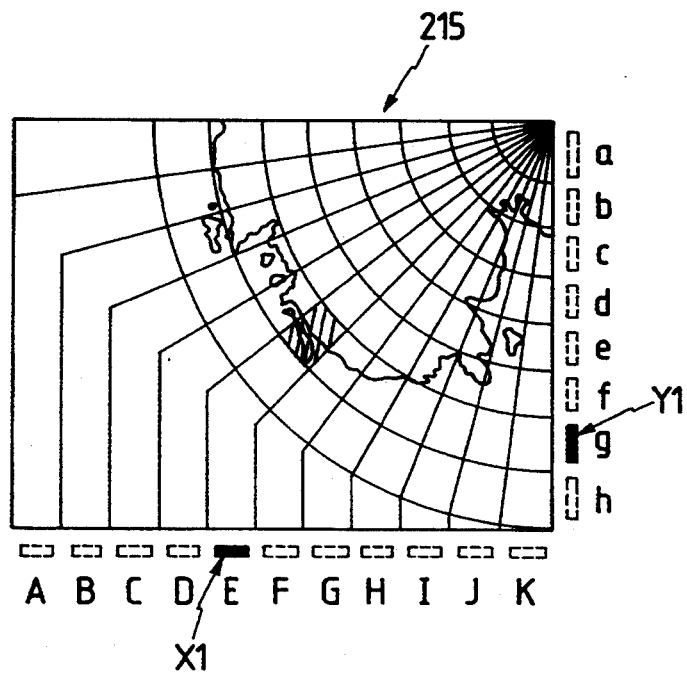

Also if the photographing location is in the Arctic or Antiarctic circle shown in FIG. 22, the switch SW26 is actuated to move the moving mark Y1 of the Y-direction to the mark "j" or one of the subsequent marks. For example, by positioning the moving mark Y1 at the symbol p and turning on the switch SW27, there is displayed, as shown in FIG. 24, a magnified view of a quadrant of the Antiarctic circle designated by the symbol p. Said magnified view 215 has arc-shaped latitude lines and radial longitude lines, and X-symbols A-K and Y-symbols a-h are provided below and at the right side of the display, in order to designate sectors defined by said latitude lines and longitude lines in the form of coordinates.

For example, if the photographing location is the hatched area in the magnified view 215, the switch SW25 is actuated to move the movable mark X1 in the X-direction to a symbol E, and the switch SW26 is actuated to move the movable mark Y1 in the Y-direction to a symbol g. By turning on the switch SW27 in this state, the representative latitude and longitude of the area specified by said symbols E and g (central values of the latitude and longitude in the area) are designated and are given to the CPU.

In the foregoing explanation there are employed representative latitude and longitude in the area surrounded by latitude lines and longitude lines, but, for a certain area around a crossing point of a latitude line and a longitude line, the latitude and longitude of said crossing point may be taken as representative values.

The height-above-sea-level setting circuit 207 has a display unit (not shown), and displays thereon the height above sea level in of meters. Said height display is increased by a unit of 10 meters by each actuation of the switch SW23, or by a unit of 100 meters by each prolonged actuation thereof, or decreased by a unit of 10 or 100 meters by each similar actuation of the switch SW24. The height above sea level thus set is supplied to the CPU.

Figure 25:
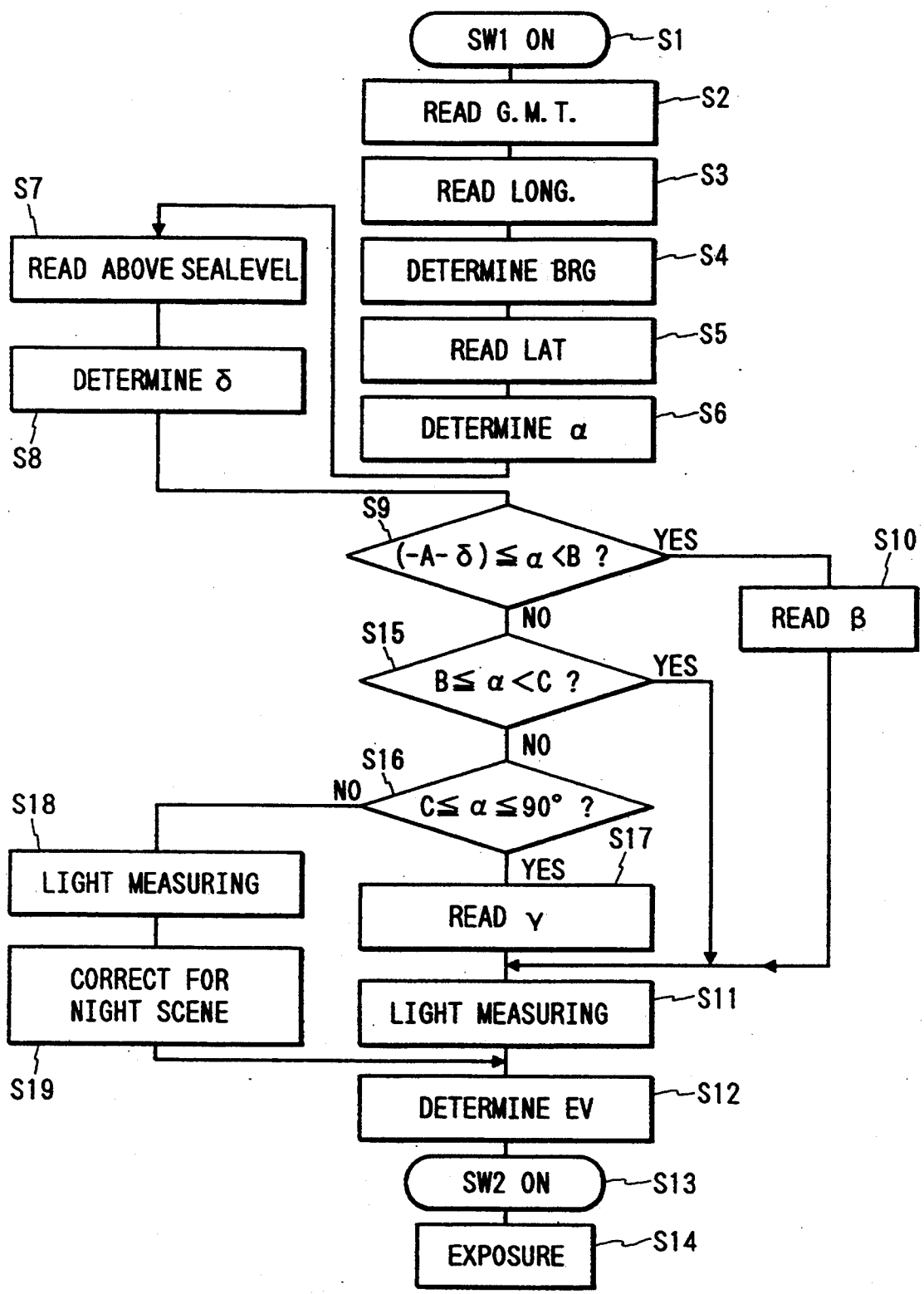
FIG. 25 is a flow chart of the operation of the second embodiment.

In the following there will be explained the function and operation of the CPU, with reference to a flow chart shown in FIG. 25.

When the switch SW1 is closed in response to the shutter releasing operation, the CPU reads the Greenwich standard time G.M.T. from the timer circuit 204 and the calendar 205 (steps S1, S2). Then the CPU reads the longitude of the photographing location set by the latitude/longitude setting circuit 206 (step S3), and calculates the sun bearing BRG at the photographing location, based on said longitude and G.M.T. (step S4).

Then the CPU reads the latitude of the photographing location designated by the latitude/longitude setting circuit 206 (step S5), and calculates the height α of the sun at the photographing location, based on the sun bearing and said latitude (step S6).

Figure 26:
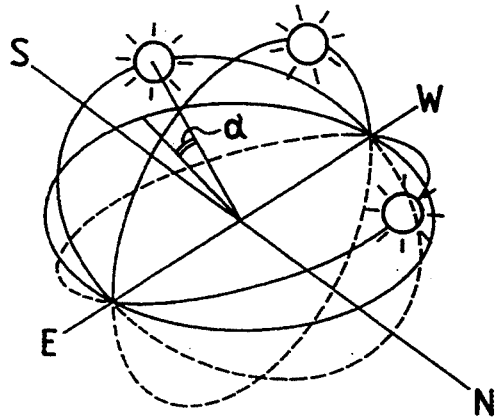
FIG. 26 is a view showing the height of sun.

The height of the sun mentioned above indicates the height angle α shown in FIG. 26. FIG. 26 illustrates the height of the sun at about 1 p.m. at spring equinox and autumn equinox in the Northern hemisphere, on the equator and in the Southern hemisphere, and said height varies in a range $-90° \leq α \leq 90°$.

Figure 27:
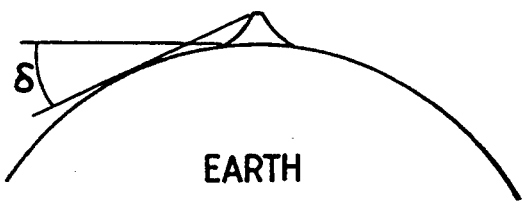
FIG. 27 is a view showing the relation between the surface of earth and a correction value δ.

After the height of the sun is obtained in the step S6, the CPU reads the height above sea level of the photographing location set by the height setting circuit 207 (step S7), and calculates the correction value δ for the height of the sun at the twilight situation, based on said height above sea level (step S8). Said correction value 6 indicates a negative angle when the horizon of 0 meter is seen from a high place (FIG. 27), and is used for correcting the lower limit angle for defining the low height range of the sun.

Figure 28:
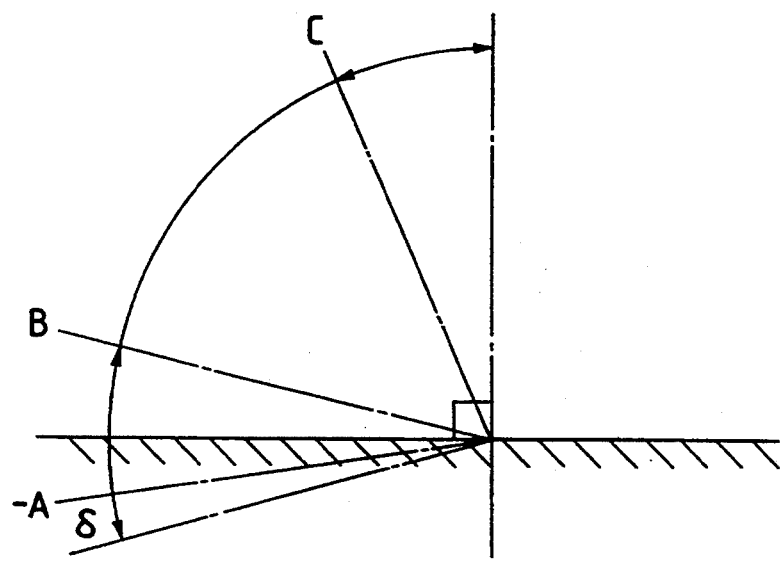
FIG. 28 is a view showing the relation between constants A-C and the height of sun.

FIG. 28 shows the relation between the height of the sun and constants A-C to be used in the subsequent steps, wherein —A and B are respectively a lower limit angle and a higher limit angle defining a low height range of the sun, and C is a lower limit angle for defining a high height range of the sun. The lower limit angle —A is determined for a time slightly before the sunrise or after the sunset. An angle "—A—δ", obtained by adding the correction value —δ to the lower limit angle —A, is taken as the corrected lower limit angle defining the low height range of the sun.

Then the sequence proceeds to a step S9 for discriminating whether the height α of the sun is positioned within a range $(-A-δ) \leq α < B$. If the sun height is within said range, namely if the current height of the sun is within a low height range, the CPU reads an exposure correction amount β of the under-exposure side (step S10), then measures the brightness of the object (step S11), determines the exposure value EV based on thus measured object brightness and the exposure correction amount β (step S12) and executes a phototaking operation in response to the closing of the switch SW2.

On the other hand, if the step S9 identifies that the height α of the sun is outside the above-mentioned range $(-A-\delta) \leq \alpha < B$, the sequence proceeds to a step S15 for discriminating whether the height α is within a range $B \leq \alpha < C$. If it is outside said range, a step S16 discriminates whether it is within a range $C \leq \alpha \leq 90°$. If it is within said range, indicating that the sun is within the high height range, the CPU reads an exposure correction value γ of the overexposure side (step S17), and determines the exposure value from the object brightness and said exposure correction value γ.

If the step S15 identifies that the height α of the sun is within the range $B \leq \alpha < C$, the sequence proceeds directly to a step S11 for determining the exposure value EV based on the object brightness. Also if the step S16 identifies that the height of the sun is outside the range $C \leq \alpha \leq 90°$, there is identified a night time, and an exposure correction (a significant correction to the underexposure side) is applied to the object brightness, in order to reproduce the impression of night (steps S19–S22).

As explained in the foregoing, the exposure control apparatus of the present embodiment applies a correction to the exposure value in the under-exposure side when the height α of the sun is in a low range, thereby making it possible to reproduce the atmosphere of early morning or evening on the photograph. Also when said height is in a high range, the exposure value is corrected to the overexposure side, whereby a bright atmosphere can be reproduced on the photograph. For example in case of photographing in Japan, the daytime from spring to summer is recognized as the time of high sun and the exposure value s corrected to the overexposure side, whereby a bright scene is reproduced on the printed photograph. On the other hand, the daytime from autumn to winter is not recognized as the time of high sun, so that the photographing operation is conducted with an exposure value of the underexposure side in comparison with that used from spring to summer, and a darker and deeper scene is reproduced on the printed photograph.

In addition the present embodiment executes the above-explained exposure correction in any location in the world, because the height of the sun varying according to the photographing location and photographing time is calculated from the designated latitude and longitude and the G.M.T.

Figure 29:
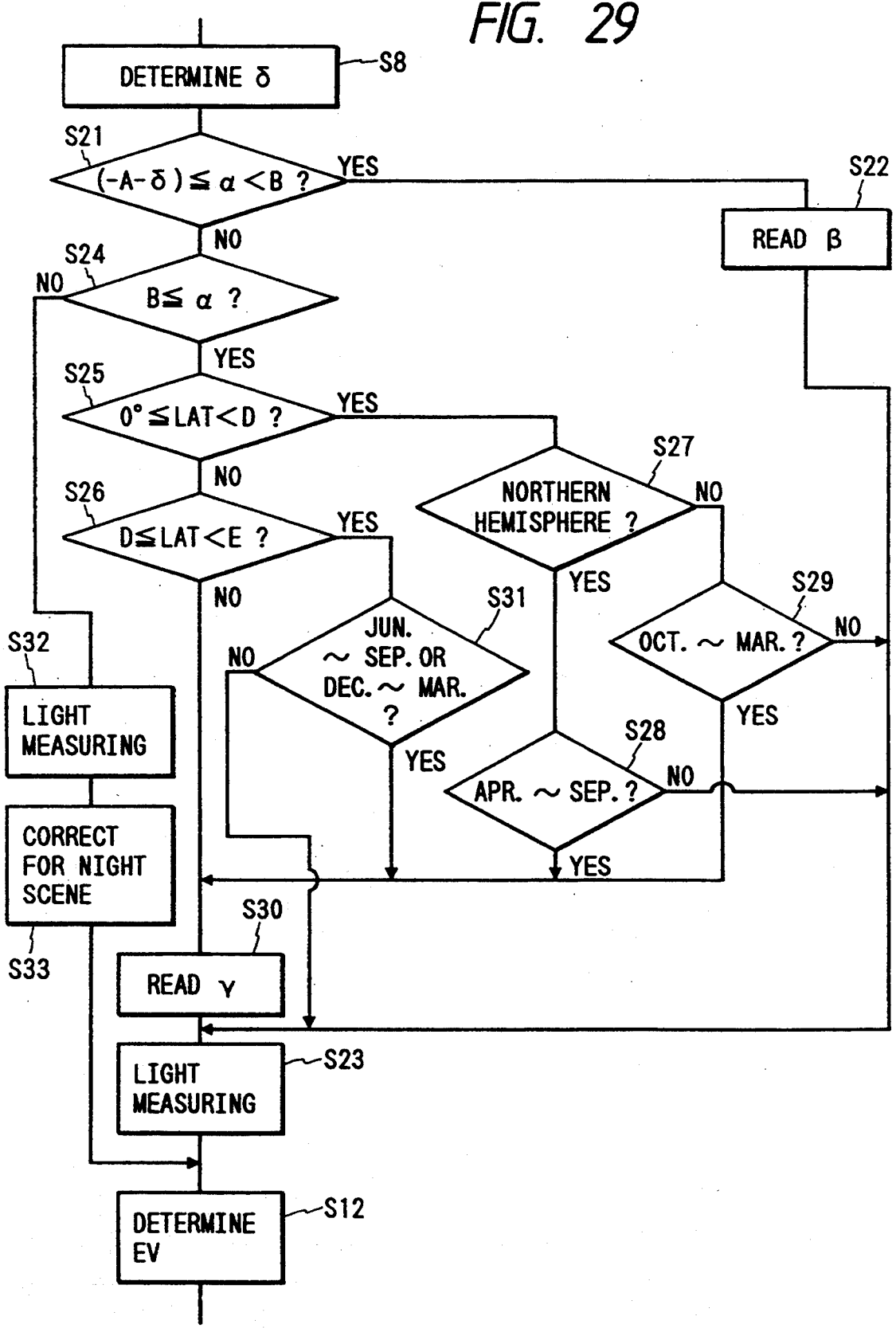
FIG. 29 is a flow chart showing a variation of the operation of the second embodiment.

FIG. 29 shows another embodiment of the operation of the CPU. In comparison with the flow chart shown in FIG. 25, the present embodiment is different in steps between the steps S8 and S12. After the calculation of the correction value δ in the step S8, a step S21 discriminates whether the height α of the sun is within a range $(-A-\delta) \leq \alpha < B$. If the sun height is within said range, the current sun height is judged to be in a low range. Thus an exposure correction amount β of the underexposure side is read (step S22) and the exposure value is determined from the object brightness and the exposure correction amount β.

If the step S21 identifies that the height of the sun is outside the above-mentioned range $(-A-\delta) \leq \alpha < B$, the sequence proceeds to a step S24 for discriminating whether a condition $B \leq \alpha$ is met. If $B > \alpha$, a night time is identified and an exposure correction is applied to the object brightness for providing the atmosphere of a night scene (step S33), and then the exposure value is determined. In case of $B \leq \alpha$, there is discriminated whether the designated latitude LAT satisfies a condition $0° \leq LAT < D$ (step S25), and, if it is outside said range, the sequence proceeds to a step S26 for discriminating whether a condition $D \leq LAT < E$ wherein D and E are constants satisfying a relation $D < E$ and indicating certain absolute latitudes regardless of the Northern or Southern latitudes.

If the step S25 identifies that the latitude is positioned between a Northern latitude D and a Southern latitude D around the equator, it is then discriminated whether the photographing location is in the Northern hemisphere or in the Southern hemisphere, by identifying whether said latitude is a Northern latitude or a Southern latitude (step S27), and the sequence proceeds to a step S28 or S29 respectively in case of Northern or Southern hemisphere. If the step S28 identifies that the current data is within a period from April to September, namely from spring to summer, the sun height is identified in the high range and an exposure correction amount δ of the overexposure side is read (step S30). On the other hand, if the step S29 identifies that the current date is within a period from October to March, namely from spring to summer, the sun height is identified in the high range and an exposure correction amount δ of the overexposure side is read. If the current date is outside the period from April to September in the step S28 or outside the period from October to March in the step S29, the sequence proceeds directly to a step S23.

Also if the step S26 identifies that the latitude is positioned between Northern latitudes D and E or between Southern latitudes D and E and a step S31 identifies that the current date is within a period from June to September or within a period from December to March, an exposure correction value δ to the overexposure side is used. Thus, in case of $D \leq LAT < E$, the exposure value is corrected to the overexposure side within the period from June to September or from December to March, without distinction between the Northern and Southern hemispheres. Therefore, for example, in the Northern hemisphere, the exposure is corrected to the overexposure side in the summer from June to September and in the winter from December to March, whereby the underexposure resulting from snow in the high latitude region is avoided. The exposure correction amount δ may be varied between summer and winter.

In the above-explained embodiment, the height above sea level may be automatically set in response to the latitude/longitude setting circuit 206, or in linkage with an altimeter. The above-mentioned embodiment may also be provided with sensors for air pressure, humidity and temperature for detecting the state of weather, namely fine, cloudy or rainy weather, thereby estimating the deviation in the twilight time. For example, in the cloudy or rainy weather, the twilight time is deviated from the sunrise or sunset time. The low height range of the sun can be regulated according to the estimated deviation of the twilight time, whereby an appropriate exposure correction can be made according to the state of weather.

In the following there will be explained a fourth embodiment of the present invention.

Figure 30:
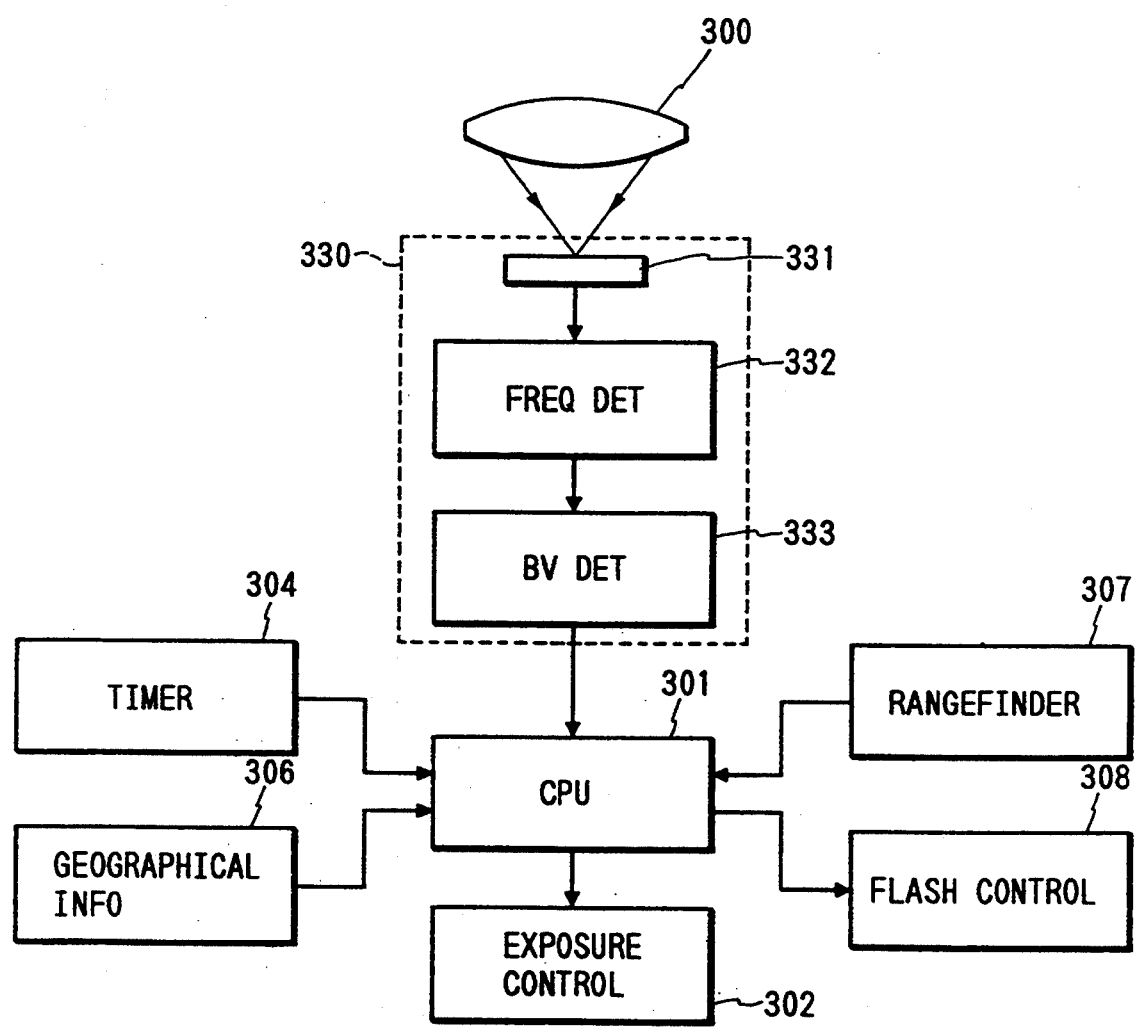
FIG. 30 is a block diagram of the exposure control apparatus constituting a fourth embodiment of the present invention.

Referring to FIG. 30, a light measuring device 330 is provided with a photosensor 331 for receiving the light coming from an object through a lens 300, a frequency detector 332 for detecting the frequency of the output signal of the photosensor, and a circuit 333 for calculating the brightness of the object from the output of the photosensor. The object is identified to be illuminated by an artificial light source, such as a fluorescent lamp, if a particular frequency (50 or 60 Hz) is identified by the frequency detector 332 in the output signal of the photosensor, or by outdoor sunlight in the absence of such particular frequency. The output signal of the light measuring device 330 is supplied to a CPU 301.

A timer 304 sends information on date and time to the CPU 301, which identifies the current season from the date information. Like the circuit 206 shown in FIG. 1, the CPU determines the current time by correcting the time difference, or determines the sunrise/sunset times, based on the information from an information input device 306 for preparing geographical information such as latitude and longitude. Said CPU is also connected to an exposure control device 302, a range finder unit 307 and a flash control device 308. Though not illustrated, shutter release switches SW1, SW2 are provided, as in FIG. 21, on the CPU.

In the following there will be explained the function of the fourth embodiment.

Figure 31:
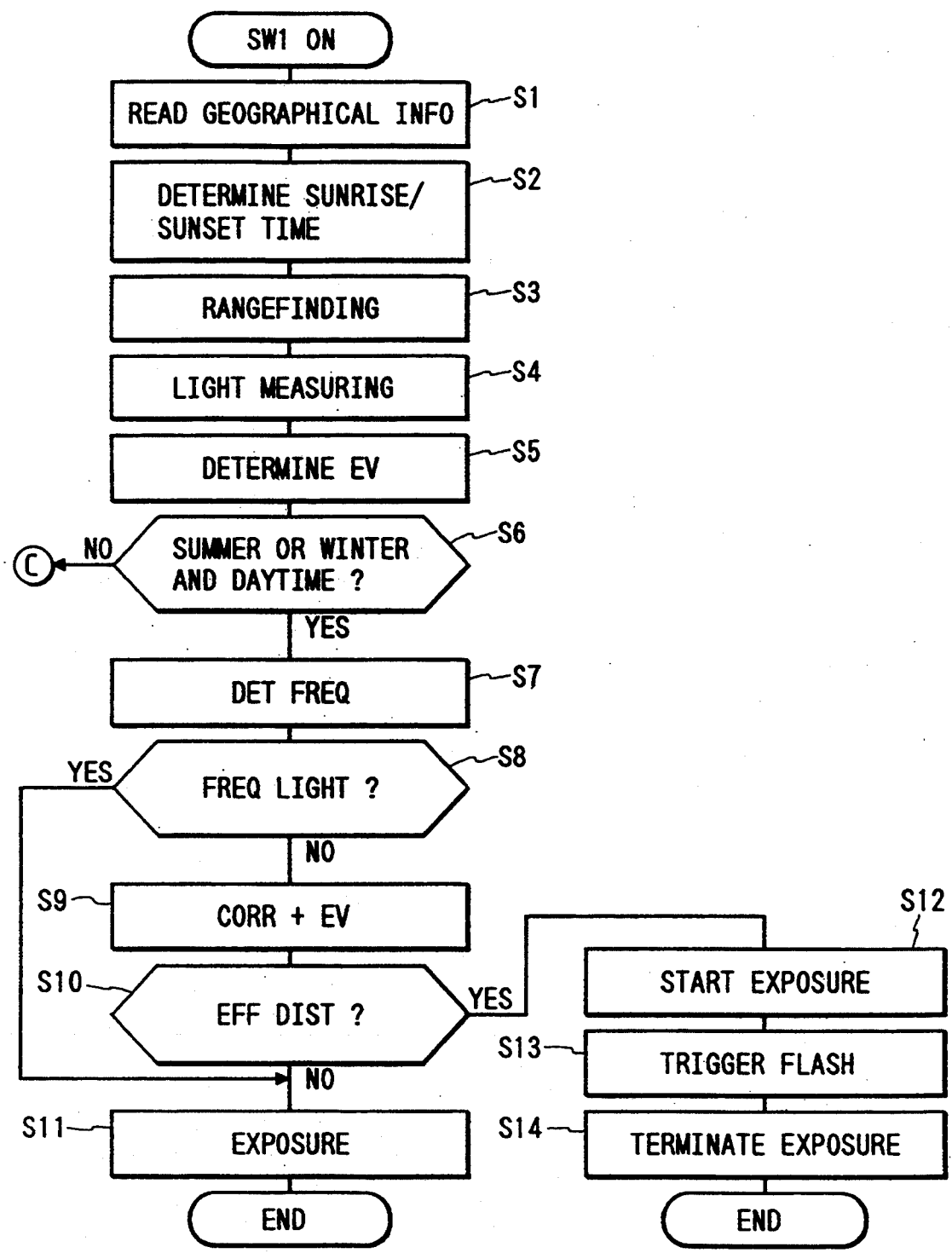
FIGS. 31 and 32 are flow charts of the operation of the fourth embodiment.

Referring to FIG. 31, when the switch SW1 is closed in response to the shutter releasing operation, the CPU reads the geographical information in a step S1, then reads the date information and the time information in a step S2, and determines the current exact time and the sunrise/sunset times based on these information. Then the range finding operation and the light measuring operation are conducted (steps S3, S4), and the exposure value is determined (step S5). Then a step S6 discriminates whether the current time is in summer or winter and is in the daytime. If the current time is in the daytime in summer or winter, the frequency detector 332 detects the frequency of light source (step S7), and the periodicity of the light source is discriminated (step S8). In the absence of periodicity, namely in the outdoor situation, the exposure value obtained in the above-explained step S5 is corrected to the plus side (step S9). The exposure correction to the overexposure side in the photographing in the daytime in summer or winter is to prevent the reproduction of white beach in summer or snow scene in winter in grayish tone.

A next step S10 discriminates whether the measured object distance is within an effective range of the illuminating light of the flash unit, and, if not, an ordinary exposure control is conducted in response to the closing of the switch SW2 by the shutter releasing operation (step S11).

Also if an indoor situation is identified in the detection of periodicity in the step S8, the ordinary exposure control is immediately executed and the photographing operation is completed.

If the step S10 identifies that the object distance is within the effective distance, a photographing operation with flash emission is conducted in response to the closing of the switch SW2 (steps S12-S14).

Figure 32:
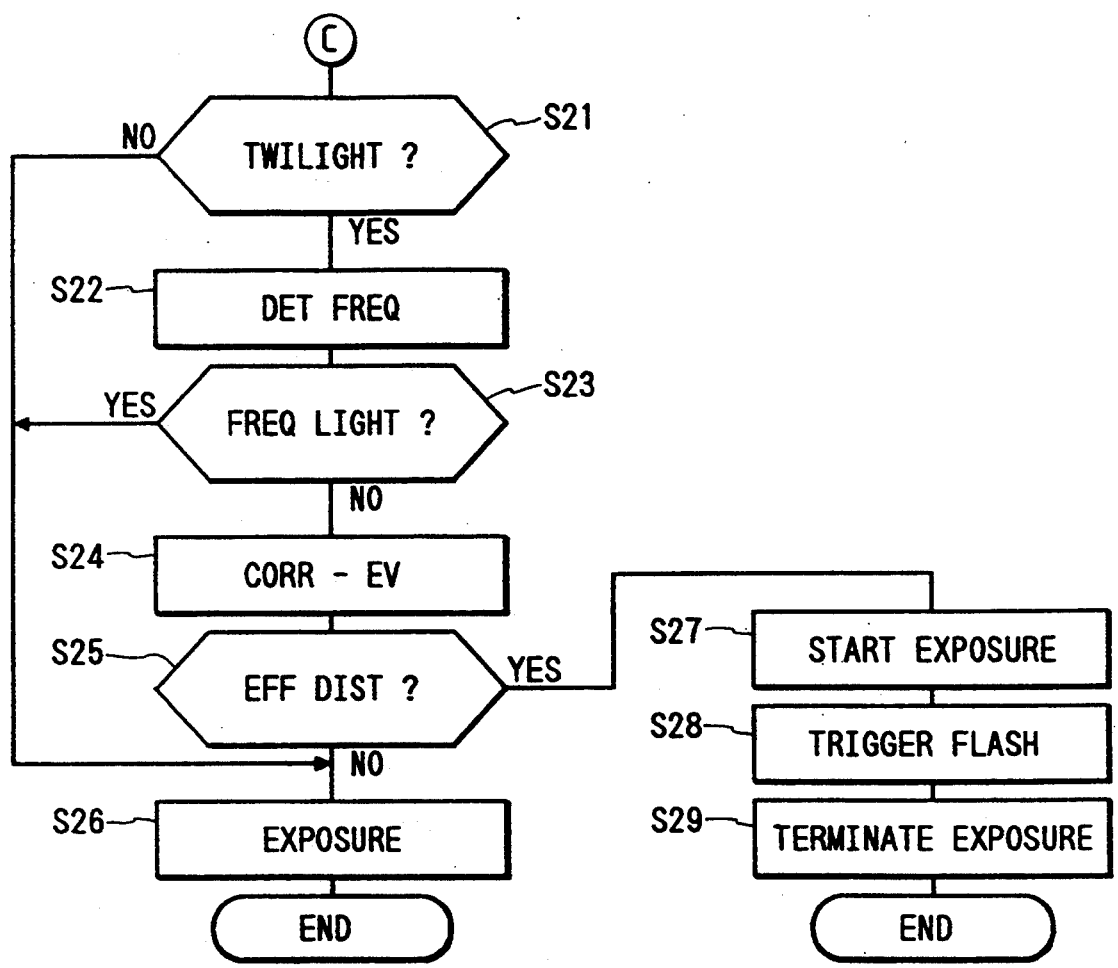

If the photographing situation is not in the daytime of summer or winter, the sequence proceeds from the step S6 to steps S21-S29 shown in FIG. 32.

At first there is discriminated whether the current time is in the twilight time, by comparison of the current time with the sunrise/sunset times determined in the step S2 shown in FIG. 31 (step S21), and, in case of twilight time, the frequency of the light source is detected by the frequency detector 332 (step S22), and the periodicity of the light source is discriminated (step S23). In the absence of periodicity, or in case of an outdoor situation, the exposure value is corrected to the minus side (step S24), and there is discriminated whether the object distance is effective for flash photographing (step S25). If the object is far, a step S26 executes exposure control for natural light illumination, whereby the twilight scene under morning or evening sunshine can be appropriately photographed with an exposure to the underexposure side.

If the step S23 identifies an indoor situation, an ordinary exposure control is immediately conducted in the step S26 and the photographing operation is completed.

If the above-mentioned step S25 identifies that the object is close, the photographing operation is completed in steps S27-S29 in the same manner as in the steps S12-S14 shown in FIG. 31. In this case the main object is subjected to an appropriate exposure by the flash emission, while the background beyond the reach of flash provides an underexposure, whereby the twilight situation can be appropriately reproduced.

Figure 33:
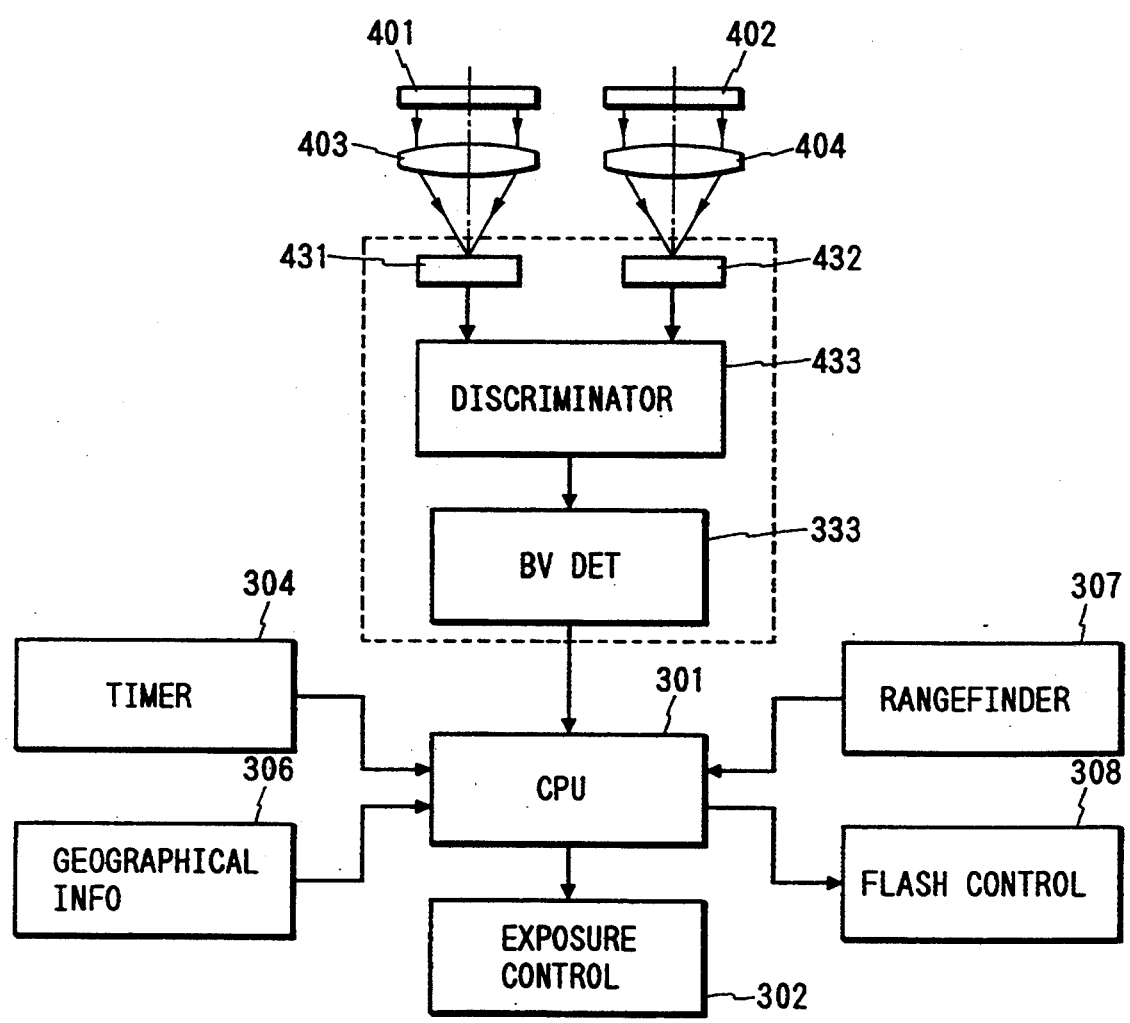
FIG. 33 is a block diagram of a variation of the fourth embodiment.

FIG. 33 shows a variation of the fourth embodiment, wherein the same components as those in FIG. 30 are represented by the same numbers and will not be explained further.

At first there will be explained the discrimination of color temperature of the light source. Different light sources have different spectral characteristics, defined by frequency-dependent distribution of light intensity. Consequently the light source can be identified by comparing said light intensity distribution. In practice, such identification is possible by comparison in two wavelength regions. For this reason, there is employed a method of comparing the intensity in a long wavelength region and a short wavelength region in the visible wavelength range. For example the sunlight at twilight time has a high intensity in the long wavelength region, while the light of a fluorescent lamp has a high intensity in the short wavelength region. Expressed in color temperature, the former has a higher color temperature while the latter has a lower color temperature. Thus the comparison of light intensity distribution in these two wavelength regions at the longer and shorter wavelengths allows identification of the color temperature, or the kind of light source.

As shown in FIG. 33, there are provided filters 401, 402 of different spectral transmissions. The filter 401 transmits the light of shorter wavelength side but does not transmit the light of longer wavelength side, while the filter 402 transmits the light of longer wavelength side but does not transmit the light of shorter wavelength side. The light of shorter wavelength transmitted by the filter 401 is condensed by a lens 403 onto a photosensor 431, while the light of longer wavelength transmitted by the filter 402 is condensed onto a photosensor 432 by a lens 404. A discriminator 433 identifies the color temperature of the light source, by comparison of the output intensities of the photosensors 431, 432. Thus an indoor or outdoor photographing situation can be identified respectively if a higher intensity is found in the shorter or longer wavelength region (respectively if the color temperature is low or high). 10 The function of the present variation will not be explained further, as it is same as that shown in FIGS. 31 and 32, except for the analysis of color temperature of the light source by the discriminator 433 in steps S7 and S22.

Figure 34:
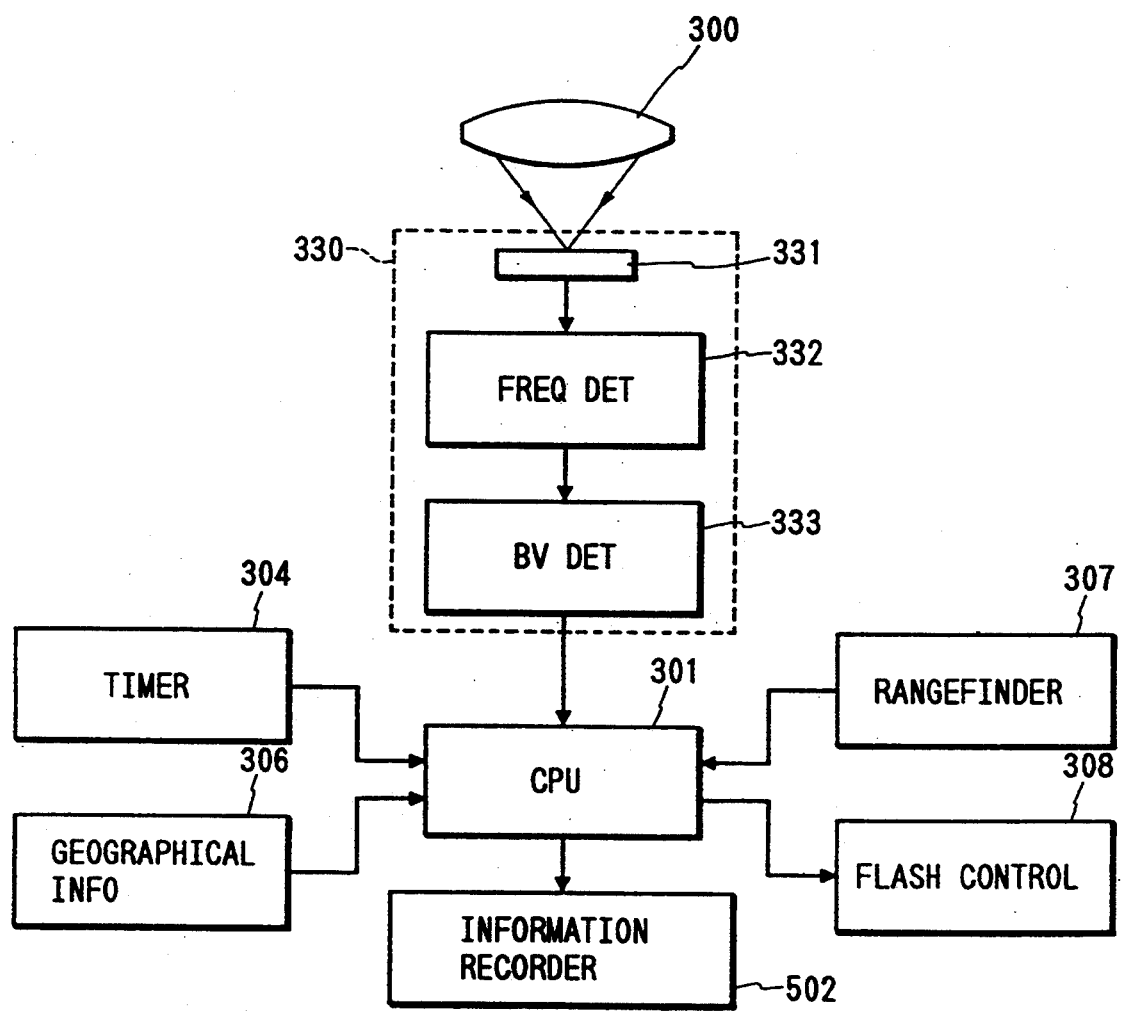
FIG. 34 is a block diagram of another variation of the fourth embodiment.

FIG. 34 shows another variation of the fourth embodiment, wherein the same components as those in FIG. 30 are represented by the same numbers and will not be explained further. An information recorder 502 shown in FIG. 34 corresponds to the exposure control device 302 in FIG. 30. In this variation, the exposure correction is not conducted at the photographing operation by the camera. Instead, information on exposure correction, corresponding to the exposure correction value, is recorded by said information recorder 502 on a recording medium such as the photographic film itself, or a magnetic recording medium, provided in advance on the film cartridge, and said information is utilized in correcting the exposure at the preparation of a print from the photographic film. In this manner there is obtained a print subjected to exposure correction similar to that in FIGS. 30 or 33. This structure is also employable in a recording system such as a still video camera, utilizing a non-photographic recording medium such as a magnetic disk.

Figure 35:
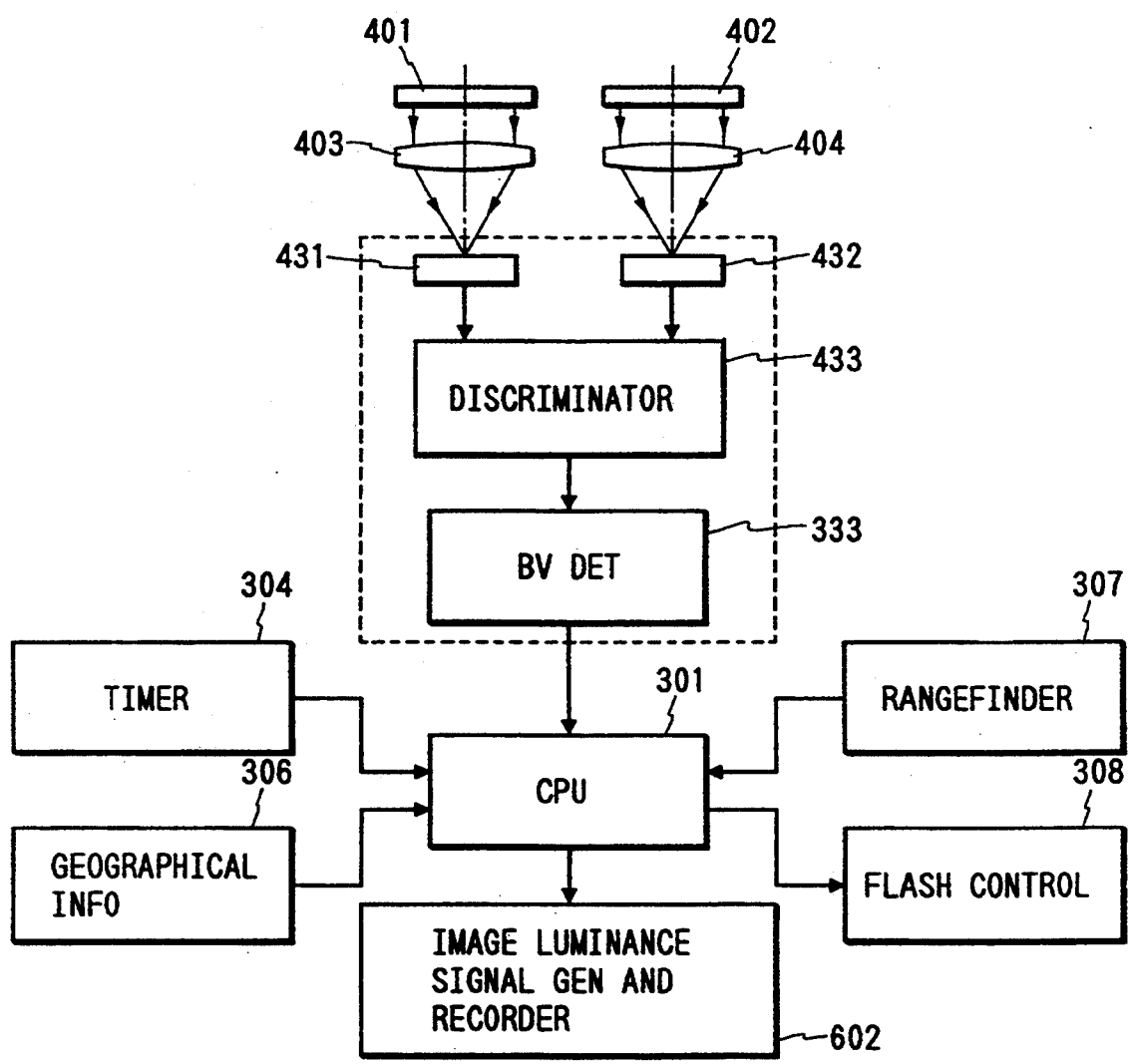
FIG. 35 is a block diagram of still another operation of the fourth embodiment.

FIG. 35 shows still another variation, wherein the same components as those in FIG. 33 are represented by the same numbers and will not be explained further. In FIG. 35, an image luminance signal generator/recorder 602 corresponds to the exposure control device 302 in FIG. 33. This variation is primarily designed, for example, for a video camera rather than an ordinary camera, and is adapted to correct the image luminance signal instead of the exposure value.

In the case where date and time are automatically corrected in correspondence to a time difference on the earth by operating switches SW1 and SW2 of the time difference correction code, as in the second embodiment, it is necessary for the operator to confirm that the correction of the time difference has been made. For example, in the case where only the current time but no date has been corrected by the time difference correction, the operator cannot confirm whether the time difference has been corrected.

The fifth embodiment described below is designed to obviate such an inconvenience. More particularly, the fifth embodiment is so constructed that, when it is judged that no date is changed by a time difference correction, a fact that time has been corrected by the time difference correction may be displayed during predetermined time. Since the camera structure adopting the fifth embodiment is the same as shown in FIG. 7, only display modes and a control operation by a control circuit will be described.

Figure 36:
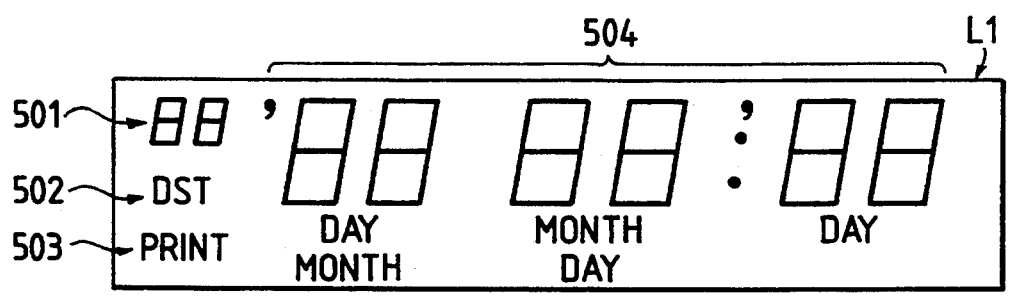
FIGS. 36 to 38, 40, 41, 43 and 44 are views showing different modes of display in the display unit of a fifth embodiment of the present invention.

FIG. 36 shows a display unit L1 of the fifth embodiment, comprising a display area 501 for displaying a time difference correction code, a display area 502 for displaying daylight saving time, a display area 503 for displaying completion of data photographing, and a display area 504 for selectively displaying calendar information including date information (year, month and day; month, day and year, or day, month and year) and time information (day, hour and minute).

Figure 37:
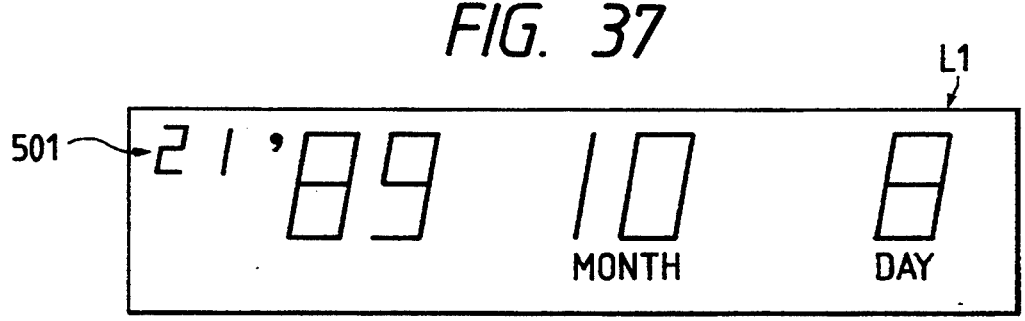
Figure 38:
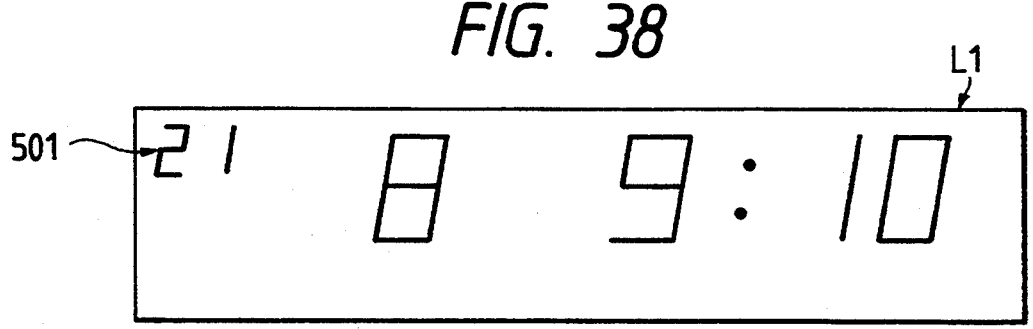
Figure 39:
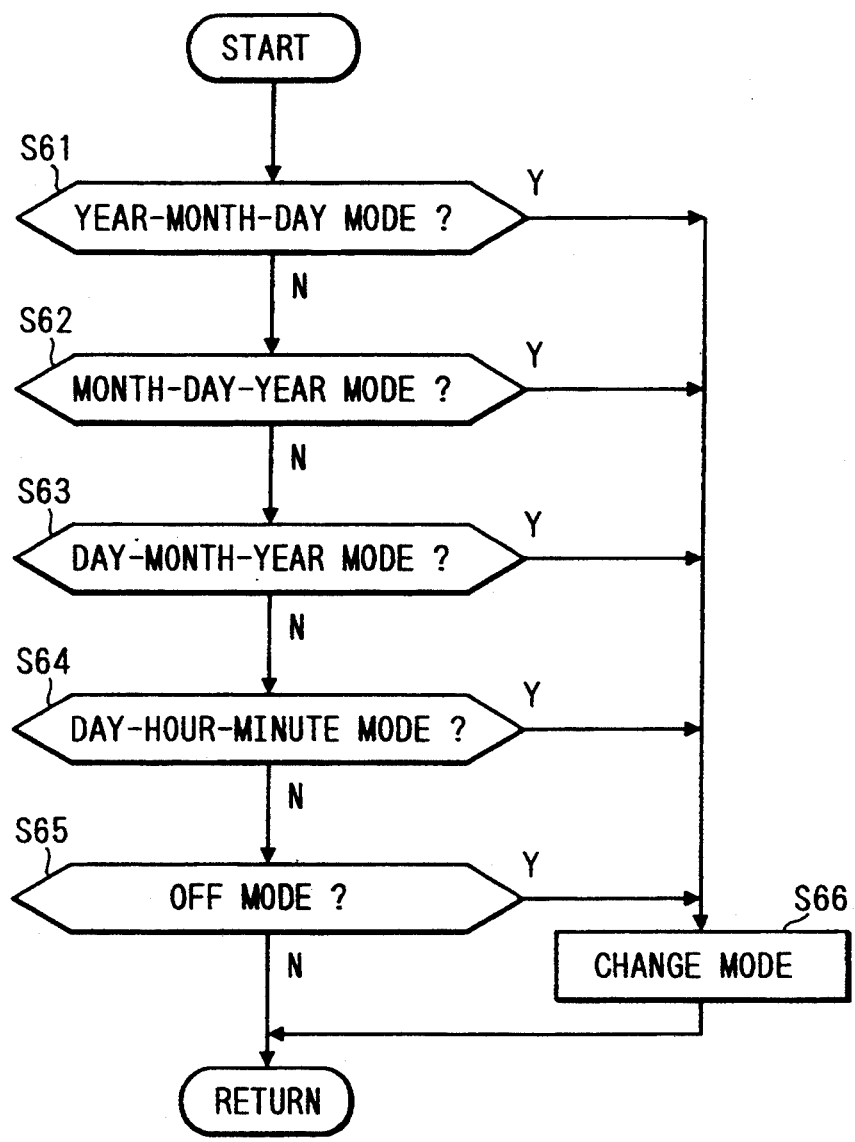
FIG. 39 is a flow chart showing the function of the fifth embodiment.

FIGS. 37 and 38 show, respectively, a state of calendar display and a state of time display in a case where Tokyo is selected by the time difference correction code. FIG. 39 shows a flow chart explaining the operation for changing over the display shown in FIG. 37 to that shown in FIG. 38.

When the switch SW6 is operated to effect mode change, judgement is made at step S61 whether the current display mode is of the year-month-day mode or not. If the display mode is of the year-month-day mode at step S61, the display mode is changed at step S66 to month-day-year mode which is the next mode in the five kinds of the display modes, that is, year-month-day mode, month-day-year mode, day-month-year mode, day-hour-minute mode and off mode (no display mode). If the year-month-day mode is not judged at step S61, judgement is made at the next step S62 whether the mode is of the month-day-year mode or not. Thus, the operation of the switch SW6 effects change of the above mentioned five display modes through steps S61 to S66 in this order.

Assume now that Beijing (time difference correction code 20) having a time difference of 1 hour from Tokyo is selected. In this case, the calendar display shown in FIG. 37 changes to that shown in FIG. 40. These two calendar displays are the same except for the code display area 501, and moreover there is no time display. Accordingly, it is not possible to confirm the content obtained by the correcting operation and it is not possible to make judgement as to whether the correction has been executed or not.

Figure 40:
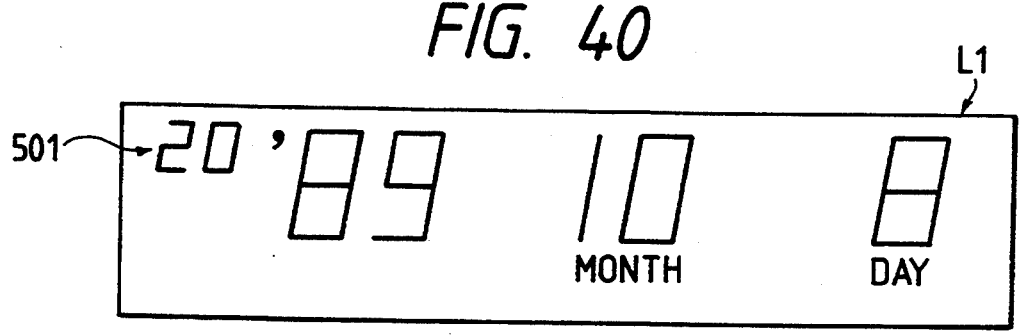
Figure 41:
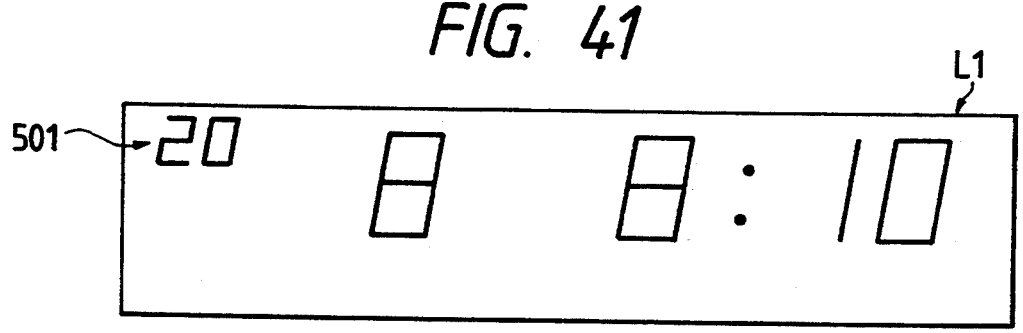
Figure 42:
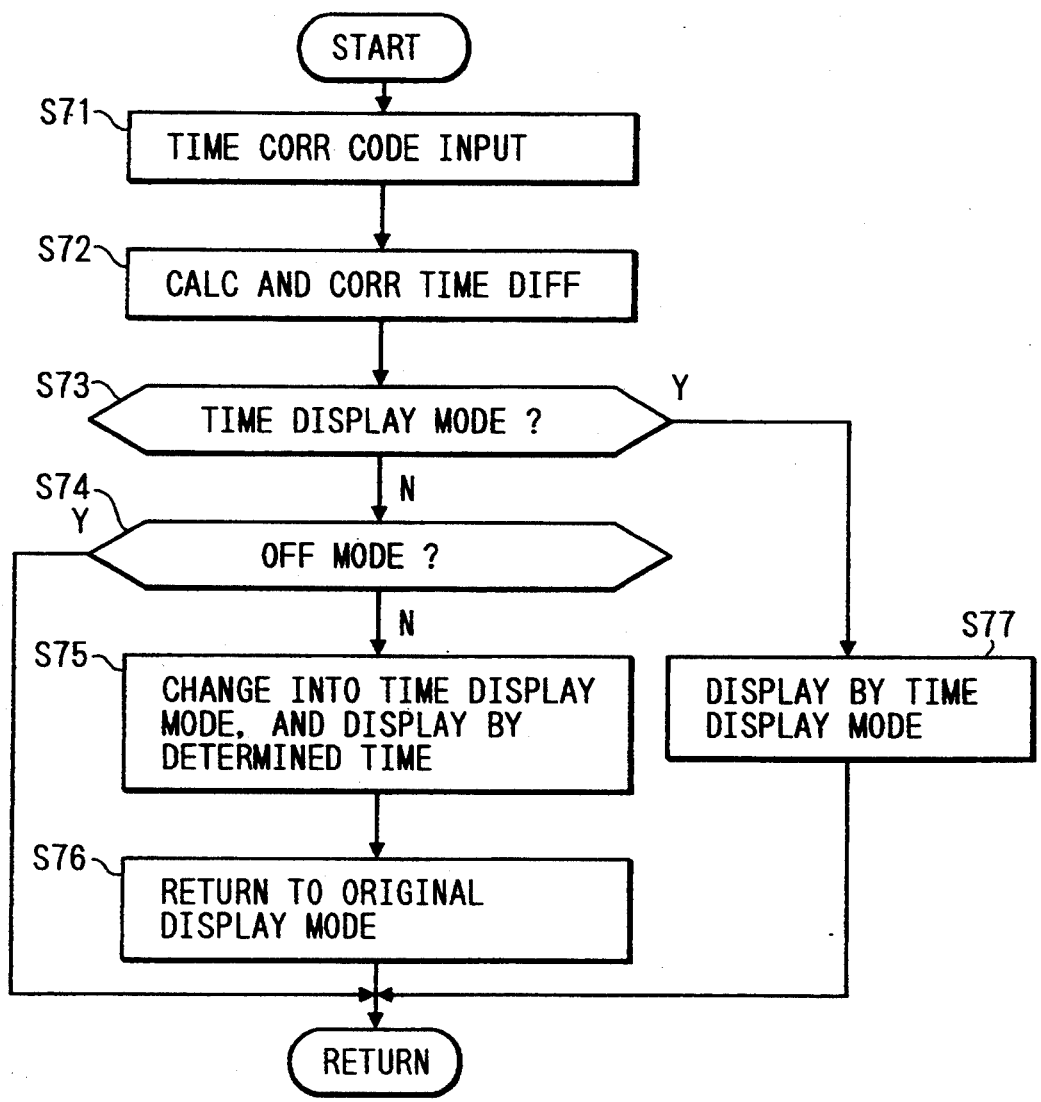
FIGS. 42 and 45 are flow charts of the operations of modifications of the fifth embodiment.

According to the fifth embodiment of the invention, the display mode is changed to a time display for a predetermined time as shown in FIG. 41, and thereafter the display mode is returned to a calendar display as shown in FIG. 40. The operation will be described with reference to the flow chart of FIG. 42.

At step S71, the time difference correction code 20 of Beijing is inputted and at step S72 calculation and correction of the time difference according to the inputted correction code are effected. At step S73 judgement is made whether the current display mode is of time display mode or not. If the current mode is of time display mode, the display mode is selected as it is. If at step S73 it is judged that the current display mode is not of time display mode, then at step S74 judgement is made whether current mode is off mode or not. If it is not, at step S75 the display mode is changed to time display mode for a predetermined time, and then at step S76 it is returned to the original mode.

Thus, the operator can confirm that the time difference correction has been effected without fail.

Figure 43:
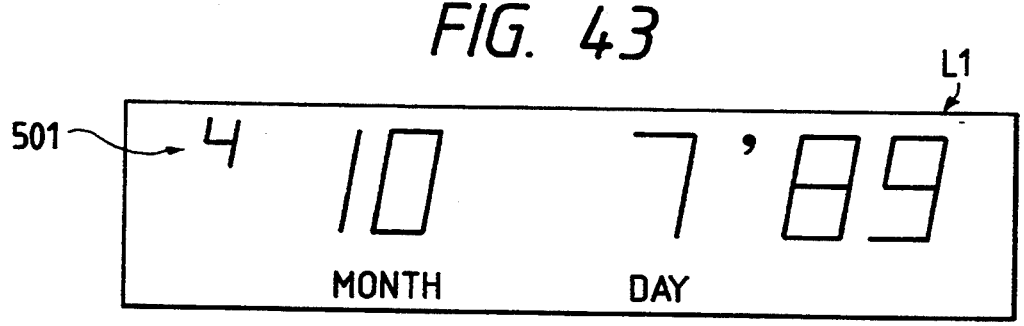
Figure 44:
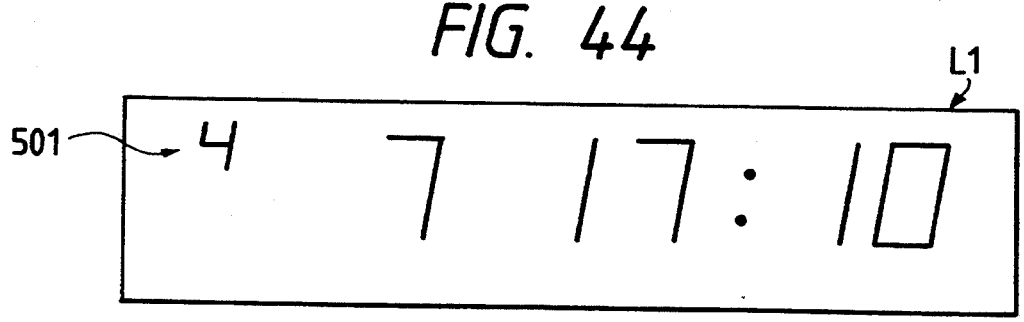

FIG. 43 shows a case where Los Angeles is selected by inputting of the corresponding time difference correction code. Since it is a.m. 9:10 at Tokyo, it is p.m. 5:10 in the previous day at Los Angeles, so numeral 8 at day display area in the calendar display in FIG. 37 will be changed to numeral 7 shown in FIG. 43. In this case, it is possible to know from the change of the day display that time difference correction operation has been executed. Further, in this example, the arrangement of the display is automatically changed to one which people living in the selected city use most conventionally or customarily, that is, from year, month and day arrangement in Tokyo to month, day and year arrangement in Los Angeles. Thus the operator advantageously realizes that the time difference correction has been effected without fail.

Figure 45:
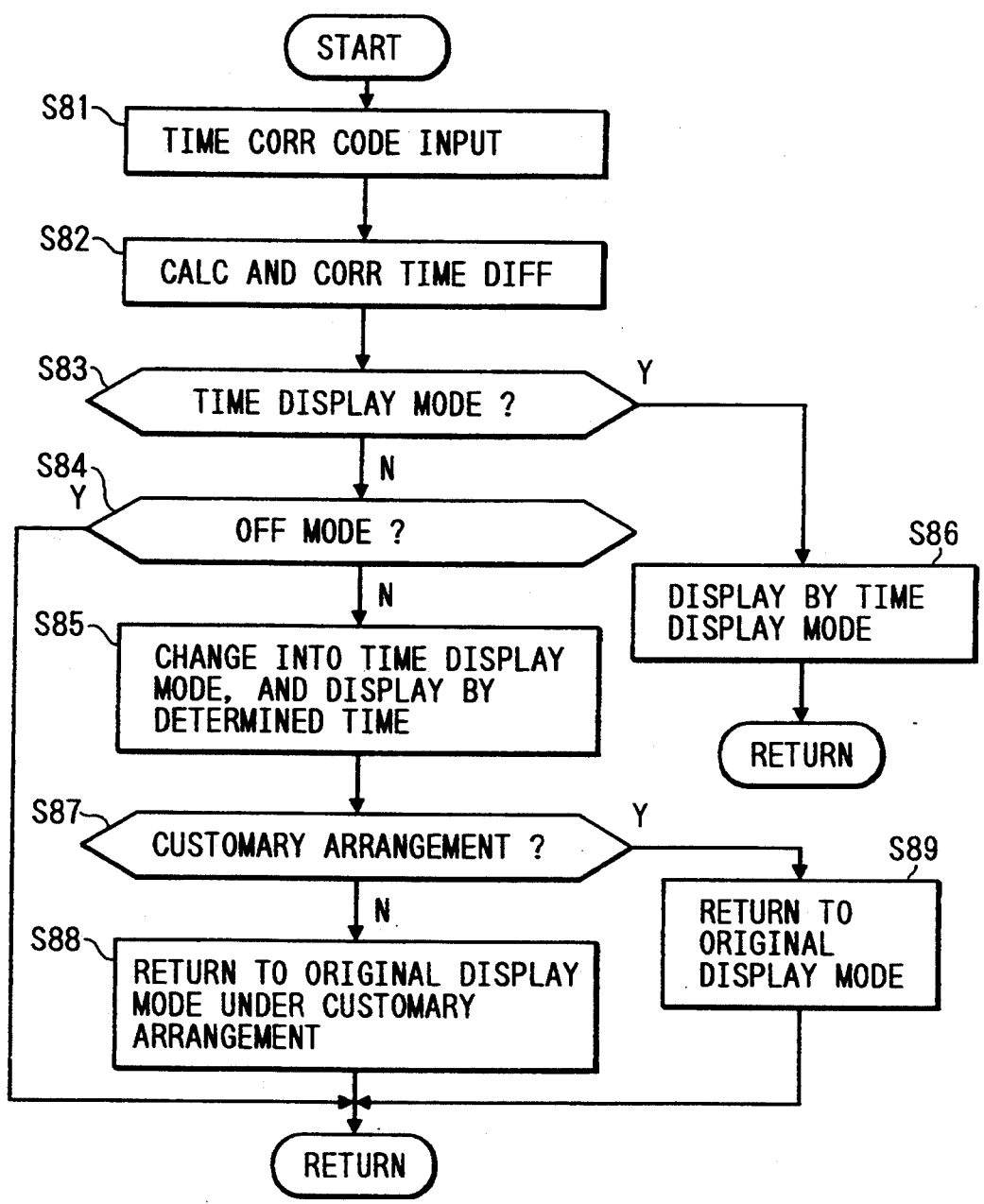

Even in this example, the calendar display may be changed to time display temporarily for a predetermined time. FIG. 45 shows a flow chart of such a case. Steps S81 to S86 and S89 of this flow chart are the same as steps S71 to S77 of FIG. 42. At step S85 time display mode is executed for the predetermined time. Then at step S87 it is judged whether arrangement of the previous calendar display is the same as the customary arrangement of calendar display at the city corresponding to the time difference correction code inputted at step S81, and if not, correction is made to the customary arrangement and returned to the calendar display at step S88.

In FIG. 45, the time display mode may be executed only in the case where no day display is changed by the time difference correction. The above mentioned embodiments may be so constructed that, in synchronization with start of manual operation for the time difference correction, change may be made to time display mode and simultaneously with the end of the operation returning to the calendar display mode may be effected.

What is claimed is:

1. An information recording device capable of loading a recording medium, comprising:
    a calendar information supplying section which supplies calendar information including date information and time information;
    a geographic information supplying section which supplies geographic information corresponding to the geographic location of the information recording device; and
    a recorder which records exposure correction information based on said calendar information and said geographic information in an information recording area of said recording medium in association with the taking of an exposure.

2. An information recording device according to claim 1, wherein said information recording area is a magnetic recording area and said recorder magnetically records said exposure correction information in said magnetic recording area.

3. An information recording device according to claim 1, wherein said recording medium includes a photographic film, and said information recording area is provided on said film.

4. An information recording device according to claim 1, wherein said information recording area is provided on a cartridge which stores a photographic film.

5. An information recording device capable of loading a recording medium, comprising:
    a calendar information supplying section which supplies calendar information including date information and time information;
    a geographic information supplying section which supplies geographic information corresponding to the geographic location of the information recording device;
    a calculator which calculates an exposure correction value, based on said calendar information and said geographic information, in association with a photographing operation; and
    a recorder which records said exposure correction value in an information recording area of said recording medium.

6. An information recording device according to claim 5, wherein said information recording area is a magnetic recording area and said recorder magnetically records said exposure correction value in said magnetic recording area.

7. An information recording device according to claim 5, wherein said recording medium includes a photographic film, and said information recording area is provided on said film.

8. An information recording device according to claim 5, wherein said recording area is provided on a cartridge which stores a photographic film.

9. An information recording device capable of loading a recording medium, comprising:
    a calendar information supplying section which supplies calendar information including date information and time information;
    a geographic information supplying section which supplies geographic information corresponding to the geographic location of the information recording device;
    an exposure correction section which effects exposure correction during photographing, based on said calendar information and said geographic information; and
    a recorder which operates, when an exposure correction has been effected by said exposure correction section, to record in a recording area of said recording medium correction prohibiting information for prohibiting exposure correction during subsequent printing of the exposure.

10. An information recording device according to claim 9, wherein said exposure correction section determines at least one of the parameters sunrise time, sunset time, and season based on said calendar information and said geographic information, and effects exposure correction based on said one parameter.

11. An information recording device according to claim 9, wherein said information recording area is a magnetic recording area and said recorder magnetically records in said magnetic recording area.

12. An information recording device according to claim 9, wherein said recording medium includes a photographic film, and said information recording area is provided on said film.

13. An information recording device according to claim 9, wherein said recording area is provided on a cartridge which stores a photographic film.

14. An information recording device capable of loading a recording medium, comprising:
    a calendar information supplying section which supplies calendar information including date information and time information;
    a geographic information supplying section which supplies geographic information corresponding to the geographic location of the information recording device;
    a calculator which calculates exposure correction information based on said calendar information and said geographic information; and
    a recorder which records said exposure correction information in an information recording area of said recording medium.

15. An information recording device according to claim 14, wherein said information recording area is a magnetic recording area and said recorder magnetically records said exposure correction information in said magnetic recording area.

16. An information recording device according to claim 14, wherein said recording medium includes a photographic film, and said information recording area is provided on said film.

17. An information recording device according to claim 14, wherein said recording area is provided on a cartridge which stores a photographic film.

18. An information recording system comprising:

an information recording device and a printing device;

said information recording device being capable of loading a recording medium and including a calendar information supplying section which supplies calendar information including date information and time information, a geographic information supplying section which supplies geographic information corresponding to the geographic location of the information recording device, and a recorder which records exposure correction information based on said calendar information and said geographic information on an information recording area of said recording medium;

said printing device including an exposure correction section for effecting exposure correction based on the recorded exposure correction information when making a corresponding print.

19. An information recording system according to claim 18, wherein said exposure correction information includes an exposure correction value.

20. An information recording system according to claim 18, wherein said printing device section which calculates an exposure correction value based on said exposure correction information, and said exposure correction section effects exposure correction on the basis of said exposure correction value.

21. An information recording system according to claim 20, wherein said exposure correction information includes photographing location, date, and time.

22. An information recording system according to claim 18, wherein said information recording area is a magnetic recording area and said recorder magnetically records said exposure correction information in said magnetic recording area.

23. An information recording system according to claim 18, wherein said recording medium includes a photographic film, and said information recording area is provided on said film.

24. An information recording system according to claim 18, wherein said recording area is provided on a cartridge which stores a photographic film.

25. An information recording system comprising:
an information recording device and a printing device;
said information recording device being capable of loading a recording medium and including a calendar information supplying section which supplies calendar information including date information and time information, a geographic information supplying section which supplies geographic information corresponding to the geographic location of the information recording device, an exposure correction section which effects exposure correction based on said calendar information and said geographic information during photographing, and a recorder which operates, when an exposure correction has been effected by said exposure correction section, to record correction prohibiting information in an information recording area of said recording medium;
said printing device including a correction prohibiting section responsive to said correction prohibiting information to prohibit exposure correction from being effected by said printing device when making a corresponding print.

26. An information recording system according to claim 25, wherein said exposure correction section determines at least one of the parameters sunrise time, sunset time, and season based on said calendar information and said geographic information, and effects exposure correction based on said one parameter.

27. An information recording system according to claim 15, wherein said information recording area is a magnetic recording area and said recorder magnetically records said exposure correction information in said magnetic recording area.

28. An information recording system according to claim 25, wherein said recording medium includes a photographic film, and said information recording area is provided on said film.

29. An information recording system according to claim 25, wherein said recording area is provided on a cartridge which stores a photographic film.

30. An information recording device capable of loading a recording medium, comprising:
a calendar information supplying section which supplies calendar information including date information and time information; and
a recorder which records exposure correction information based on said calendar information in an information recording area of said recording medium in association with the taking of an exposure.

31. An information recording device capable of loading a recording medium, comprising:
a geographic information supplying section which supplies geographic information corresponding to the geographic location of the information recording device; and
a recorder which records exposure correction information based on said geographic information in an information recording area of said recording medium in association with the taking of an exposure.

32. An information recording device capable of loading a recording medium, comprising:
an exposure correction information supplying section which supplies information relating to exposure correction at a time of photographing;
a recorder which records said exposure correction information in an information recording area of said recording medium.

33. An information recording device capable of loading a recording medium, comprising:
an exposure correction information supplying section which supplies information relating to exposure correction at a time of photographing;
an exposure correction section which effects exposure correction during photographing, based on said exposure correction information; and
a recorder which operates, when an exposure correction has been effected by said exposure correction section, to record in a recording area of said recording medium correction prohibiting information for prohibiting exposure correction during subsequent printing of the exposure.

34. An information recording system comprising:
an information recording device and a printing device;
said information recording device being capable of loading a recording medium and including an information supplying section which supplies information relating to exposure correction, and a recorder which records said exposure correction information on an information recording area of said recording medium;

said printing device including an exposure correction section which effects exposure correction based on the recorded exposure correction information when making a corresponding print.

35. An information recording system comprising:

an information recording device and a printing device;

said information recording device being capable of loading a recording medium and including an information supplying section which supplies information relating to exposure correction, an exposure correction section which effects exposure correction based on said exposure correction information during photographing, and a recorder which operates, when an exposure correction has been effected by said exposure correction section, to record correction prohibiting information in an information recording area of said recording medium;

said printing device including a correction prohibiting section responsive to said correction prohibiting information to prohibit exposure correction from being effected by said printing device when making a corresponding print.

* * * * *